United States Patent
Iwanaga et al.

(10) Patent No.: US 6,656,542 B2
(45) Date of Patent: Dec. 2, 2003

(54) GUEST-HOST LIQUID CRYSTAL COMPOSITION AND GUEST-HOST LIQUID CRYSTAL DISPLAY DEVICE

(75) Inventors: Hiroki Iwanaga, Yokohama (JP); Yutaka Nakai, Yokohama (JP); Katsuyuki Naito, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 106 days.

(21) Appl. No.: 10/084,064

(22) Filed: Feb. 28, 2002

(65) Prior Publication Data

US 2002/0192398 A1 Dec. 19, 2002

(30) Foreign Application Priority Data

Mar. 1, 2001 (JP) ........................................ 2001-057175
Dec. 20, 2001 (JP) ........................................ 2001-388326

(51) Int. Cl.⁷ .......................... C09K 19/60; C09K 19/32
(52) U.S. Cl. ................. 428/1.1; 252/299.1; 252/299.62
(58) Field of Search ................... 252/299.1, 299.01, 252/299.62; 428/1.1; 349/182

(56) References Cited

U.S. PATENT DOCUMENTS

| 4,434,072 A | 2/1984 | Imahori et al. ........... 252/299.1 |
| 4,456,545 A | 6/1984 | Weber et al. ............. 255/299.1 |
| 4,585,574 A | 4/1986 | Blunck et al. ............ 252/299.1 |
| 4,596,666 A | 6/1986 | Blunck et al. .......... 252/299.01 |
| 4,689,171 A | 8/1987 | Blunck et al. ........... 252/299.1 |
| 4,702,561 A | 10/1987 | Huffman ..................... 350/349 |
| 5,143,644 A * | 9/1992 | Yamaoka et al. ...... 252/299.62 |

FOREIGN PATENT DOCUMENTS

| EP | 0108472 | 5/1984 |
| EP | 0244488 | 11/1987 |
| EP | 0307866 | 3/1989 |
| GB | 2155489 | 9/1985 |
| JP | 09-302349 | 11/1997 |
| JP | 11-172252 | 6/1999 |
| JP | P2001-106645 A | 4/2001 |

OTHER PUBLICATIONS

Hiroki Iwanaga and Katsuyuki Naito, Highly Soluble Anthraquinone Dyes with $CF_3$–Groups for Guest–Host Liquid Crystal Displays, Jpn. J. Appl. Phys. vol. 37 (1998), Part 2, No. 3B, pp. L356–L358.

Katsuyuki Naito, Monthly Display, Apr. 2000, p. 10–14.

* cited by examiner

*Primary Examiner*—Shean O. Wu
(74) *Attorney, Agent, or Firm*—Finnegan, Henderson, Farabow, Garrett & Dunner, L.L.P.

(57) ABSTRACT

Disclosed is a guest-host liquid crystal composition, comprising a host liquid crystal material and a dichroic dye mixed as a guest in the host liquid crystal material. The liquid crystal material has a condensed ring in its molecular structure, and the dichroic dye is a compound having a condensed ring bonded to the basic skeleton as a substituent.

20 Claims, 1 Drawing Sheet

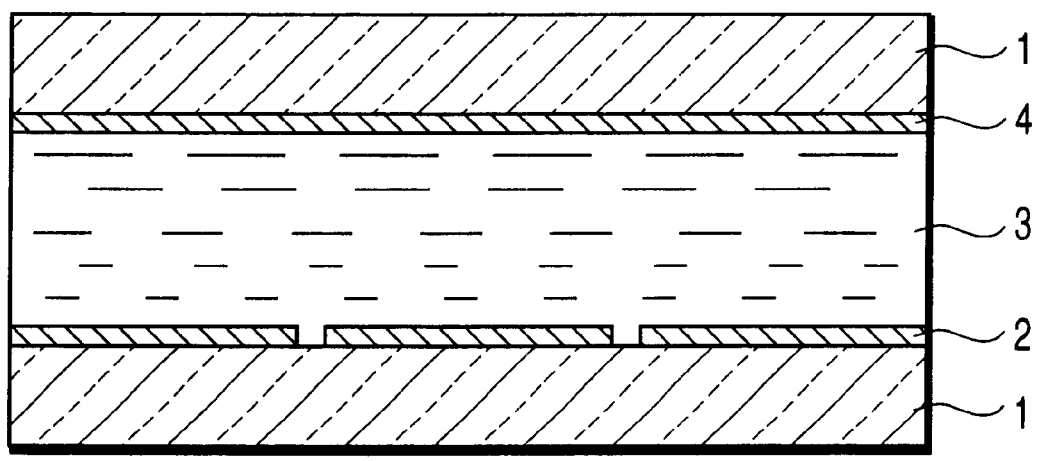
FIGURE

GUEST-HOST LIQUID CRYSTAL COMPOSITION AND GUEST-HOST LIQUID CRYSTAL DISPLAY DEVICE

CROSS-REFERENCE TO RELATED APPLICATIONS

This application is based upon and claims the benefit of priority from the prior Japanese Patent Applications No. 2001-057175, filed Mar. 1, 2001; and No. 2001-388326, filed Dec. 20, 2001, the entire contents of both of which are incorporated herein by reference.

BACKGROUND OF THE INVENTION

1. Field of the Invention

The present invention relates to a guest-host liquid crystal composition and a guest-host liquid crystal display device.

2. Description of the Related Art

A guest-host (GH) type liquid crystal display device (LCD) in which a dichroic dye is dissolved in a liquid crystal material has a large viewing angle and permits a bright and clear display and, thus, attracts attentions in this technical field. In order to realize a brighter color and to permit the driving at a low voltage in the GH-LCD, it is necessary for the dichroic dye to be dissolved in the liquid crystal material in a high concentration because the GH liquid crystal having a high dye concentration has a large absorption coefficient so as to make it possible to decrease the thickness of the cell required for realizing a predetermined light absorption intensity. It is also possible to enlarge color reduction aria and to increase the contrast in the same thickness of the cell by using a GH liquid crystal having a high dye concentration.

When it comes to the solubility of the dichroic dye, the solubility in the low temperature region is important. In the case of using a dichroic dye having the solubility markedly lowered under low temperatures, the dye is precipitated if the display device is exposed to a low temperature so as to make it difficult to perform the display. Further, it is effective to use a dye that is highly amorphous and permits the supersaturated state to be stable. In the general TFT display device, however, an irregularity is generated on the substrate surface so as to promote the precipitation of the dye, with the result that the supersaturated state is not stable.

If the dye is once precipitated, it is difficult for the dye to be restored even if the temperature of the display device is brought back to room temperature, because, under the environment in which a cell having a small cell gap is filled with a liquid crystal having a viscosity higher in general than that of the liquid, the diffusion rate of the molecule is low so as to make it difficult to eliminate easily the difference in the dye concentration between the dye precipitated portion and the other region.

It was customary to use anthraquinone-based dyes, which are tough and excellent in reliability, as the dichroic dye. Further, the anthraquinone-based dyes are relatively small in the half-width of the absorption spectrum, which is advantageous in obtaining a clear color display in the stacked type display device (subtractive color mixing).

However, it is difficult to dissolve the anthraquinone-based dichroic dye, which is shaped closer to a plane, in liquid crystal molecules, which are rod-shaped, in a high concentration. Concerning the problem, the present inventors have found that the anthraquinone-based dichroic dyes having a particular feature in the molecular structure exhibit an excellent solubility in the fluorine-containing liquid crystal having a rod-like structure (H. Iwanage and K. Naito, Jpn, J. Appl. Phys, 37, L356 (1998)).

In the GH-LCD, the dichroic ratio as well as the solubility of the dichroic dye greatly affects the display performance. In general, the rod-like azo-based dye is known to have a large dichroic ratio. In the case of the azo-based dye, it is reported that the order parameter of the liquid crystal is increased by the dissolution of the dye. On the other hand, where the anthraquinone-based dye having a planar structure is dissolved in a liquid crystal, the order parameter of the liquid crystal is lowered. Particularly, the tendency is rendered prominent under the state of a high dye concentration.

Under the circumstances, the present invention is intended to provide a guest-host liquid crystal composition having a high dichroic ratio and capable of maintaining a high dye concentration even under a low temperature.

Another object of the present invention is to provide a liquid crystal display device excellent in display characteristics and reliability.

BRIEF SUMMARY OF THE INVENTION

According to an aspect of the present invention, there is provided a guest-host liquid crystal composition, comprising:

a host liquid crystal material, the liquid crystal material having a condensed ring in the molecular structure; and a dichroic dye mixed as a guest in the host liquid crystal material, the dichroic dye having a condensed ring as a substituent bonded to the basic skeleton.

According to another aspect of the present invention, there is provided a liquid crystal display device, comprising:

a substrate having an electrode mounted thereto;

a liquid crystal layer arranged on the electrode; and a transparent electrode arranged on the liquid crystal layer;

wherein the liquid crystal layer comprises a host liquid crystal material and a dichroic dye mixed as a guest in the host liquid crystal material, the liquid crystal material having a condensed ring in the molecular structure, and the dichroic dye having a condensed ring as a substituent bonded to the basic skeleton.

BRIEF DESCRIPTION OF THE SEVERAL VIEWS OF THE DRAWING

The single FIGURE is a cross sectional view showing as an example the construction of a liquid crystal display device according to one embodiment of the present invention.

DETAILED DESCRIPTION OF THE INVENTION

The present invention will now be described in detail.

As a result of an extensive research, the present inventors have found that it is possible to realize a high solubility of a dye in a liquid crystal material even under a low temperature region and to achieve a high dichroic ratio by introducing a condensed ring portion into the molecular structure of each of the liquid crystal molecules constituting the GH liquid crystal composition and the dye molecule, so as to arrive at the present invention.

The term "condensed ring" referred to herein represents the structure that the molecule has a plurality of rings and at least two rings share a side such as the structure of anthracene, naphthalene, tetrahydro naphthalene, and decahydro naphthalene.

Where a condensed ring is included in each of the liquid crystal molecule and the dye molecule, the intermolecular mutual function between the liquid crystal and the dye is increased. The increased intermolecular mutual function noted above implies that the mutual function between the solvent and the solute is large so as to contribute to the improvement in the solubility of the dichroic dye in the liquid crystal material. The increased intermolecular mutual function between the liquid crystal and the dye also implies that the dye molecules more stably perform a salvation within the liquid crystal, and the particular effect contributes to the improvement in the dichroic ratio.

The mutual function between the atomic groups each having a condensed ring is markedly strong, compared with the mutual function between the ordinary planar molecule (anthraquinone-based dye) and the rod-like molecule (liquid crystal molecule), so as to obtain the effect described above.

In the dichroic dye used in one embodiment of the present invention, a condensed ring is introduced into a substituent bonded to the anthraquinone skeleton forming the basic skeleton, as shown in general formula (1) given below:

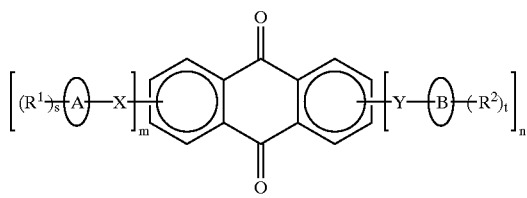

(1)

where X and Y, which may be the same or different, denote a divalent atomic group selected from the group consisting of O, S, Se, $CH_2$, NH and ester; at least one of A and B, which may be the same or different, denotes an atomic group having a condensed ring in its structure, and the other denotes a substituted or unsubstituted cyclic structure, a linear alkyl group or a branched alkyl group; $R^1$ and $R^2$, which may be the same or different, denote a hydrogen atom, a linear or branched alkyl group having 30 or less carbon atoms, or a halogen atom; s and t denote integers; and m and n denote integers falling within a range of between 0 and 4, at least one of m and n being not zero.

The effect of one embodiment of the present invention can be obtained, if a condensed ring is introduced into at least one of A and B in general formula (1) given above. It is possible for the other of A and B to be a single ring structure such as a phenyl group, a substituted phenyl group, a cyclohexyl group, or a substituted cyclohexyl group, a linear alkyl group or a branched alkyl group. Particularly, where a naphthalene skeleton is introduced as A into the compound represented by general formula (1), it is desirable to introduce a cyclohexyl group or a substituted cyclohexyl group as B into the compound of general formula (1) in order to strengthen the intermolecular mutual function between the dye and the liquid crystal and to strengthen the amorphous state of the dye so as to realize a high solubility.

The substituents introduced as $R^1$ and $R^2$ into the compound of general formula (1) include, for example, linear or branched alkyl groups such as a methyl group, an ethyl group, a propyl group, an isopropyl group, a butyl group, an isobutyl group and a t-butyl group, and a halogen atom. It is particularly desirable for a branched alkyl group and a fluoroalkyl group to be introduced as $R^1$ and $R^2$ into the compound represented by the general formula (1) in terms of the improvement in the asymmetric properties and the local introduction of a polar group.

The anthraquinone skeleton itself forming the basic skeleton of the compound of general formula (1) is a kind of the condensed ring. However, the effect of one embodiment of the present invention cannot be obtained in the case of a dichroic dye having a condensed ring in the basic skeleton. To be more specific, the effect of improving the solubility of the dichroic dye can be obtained in one embodiment of the present invention in the case where a condensed ring is present in the substituent bonded to the basic skeleton. The dye molecule performs a solvation within the liquid crystal molecules in the GH liquid crystal material. In this case, the dye molecules and the liquid crystal molecules tend to assume the positional relationship that permits the greatest mutual function between the dye molecules and the liquid crystal molecules. The optimum positional relationship noted above can be achieved easily if the condensed ring providing the center of the intermolecular mutual function is positioned in the flexible portion.

The dichroic dye used in another embodiment of the present invention can be provided by, for example, a compound having substituents in 1, 4, 5 and 8 positions as shown in general formula (2) given below:

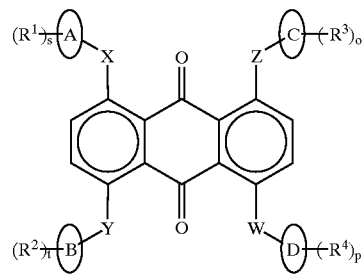

(2)

where each of X, Y, Z and W, which may be the same or different, denotes a divalent atomic group selected from the group consisting of O, S, Se, $CH_2$, NH and ester; at least one of A, B, C and D, which may be the same or different, denotes an atomic group having a condensed ring in its structure, and the others denote a substituted or unsubstituted cyclic structure, a linear alkyl group or a branched alkyl group; each of $R^1$, $R^2$, $R^3$ and $R^4$, which may be the same or different, denote a hydrogen atom, a linear or branched alkyl group having 30 or less carbon atoms or a halogen atom; and s, t, o and p denote an integer.

In general formula (2) given above, it is desirable for A to denote a naphthalene skeleton, for B to denote a benzene ring, for C to denote a benzene ring, and for D to denote a naphthalene ring in view of the improvement in the amorphous state of the dye. Also, it is most desirable for branched alkyl groups to be introduced into the compound of general formula (2) as $R^1$ and $R^2$.

Further, it is desirable to use in another embodiment of the present invention the compound represented by general formula (3) given below as the dichroic dye:

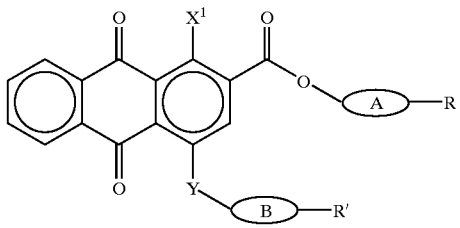
(3)

where $X^1$ denotes an amino group selected from the group consisting of $NH_2$, $NHR^{11}$ and $NH(R^{12})$, wherein each of $R^{11}$ and $R^{12}$ denotes a linear or branched alkyl group having 30 or less carbon atoms or a halogen atom; Y denotes a divalent atomic group selected from the group consisting of O, S, Se, $CH_2$, NH and ester; at least one of A and B, which may be the same or different, denotes an atomic group having a condensed ring in its structure, and the other denotes a substituted or unsubstituted cyclic structure, a linear alkyl group or a branched alkyl group; and each of R and R', which may be the same or different, denotes a hydrogen atom, a linear or branched alkyl group having 30 or less carbon atoms and a halogen atom.

In general formula (3) given above, it is desirable for A to denote a naphthalene skeleton and for B to denote a benzene ring or a cyclohexyl ring in view of the asymmetric nature of the molecular structure. In this case, it is possible to improve the solubility of the dye in the liquid crystal by introducing a tert-butyl group and a fluoroalkyl group such as $CF_3$ into the compound of general formula (3) as R and R'. Alternatively, it is also possible to introduce into the compound of general formula (3) a benzene ring as A, a naphthalene ring as B, and a sec-butyl group and a hydrogen atom as R and R', respectively. In this case, it is possible to improve the solubility of the dye in also the liquid crystal material not having a condensed ring.

Among the compounds represented by general formulas (1) to (3) given above, it is most desirable to use the compound represented by general formula (3) in view of its high solubility.

Among the dichroic dyes represented by general formula (1), the compounds having an asymmetric structure are excellent in solubility in, particularly, a F-based liquid crystal material. The particular dichroic dye includes the compounds represented by general formula (31) given below:

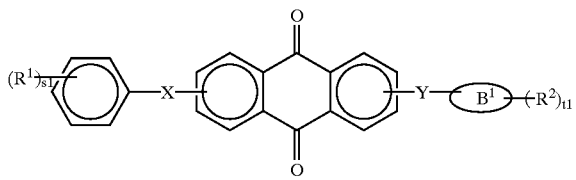
(31)

where each of X and Y, which may be the same or different, represents a divalent atomic group selected from the group consisting of O, S, Se, $CH_2$, NH and ester; $B^1$ represents an atomic group having a condensed ring in its structure; each of $R^1$ and $R^2$, which may be the same or different, represents a hydrogen atom, a linear or branched alkyl group having 30 or less carbon atoms, and a halogen atom; s1 is an integer of 0 to 5; and t1 is an integer of 1 to 7.

In the dichroic dye represented by general formula (31), the condensed ring $B^1$ connected to the substituent produces two kinds of effects as described below so as to contribute to the improvements in the solubility of the dichroic dye and in the dichroic ratio.

(1) The condensed ring present in a flexible portion of the substituent strongly performs a mutual function with the liquid crystal molecules providing the solvent. In addition, since the condensed ring is present in a flexible portion, the condensed ring is easy to assume the conformation advantageous for realizing a strong mutual function with the liquid crystal molecule.

(2) The asymmetry of the molecular structure is large in the compound in which a condensed ring is connected to a part of the substituent. As a result, the amorphous state of the compound is strengthened so as to be unlikely to be crystallized within the liquid crystal material. Also, such a compound tends to be excellent in the saturation solubility under, particularly, a low temperature.

The dichroic dyes represented by general formulas (32) and (33) given below also produce the particular effect:

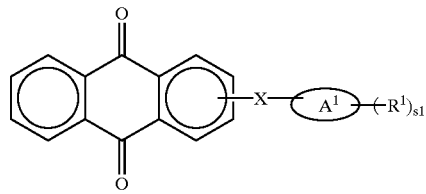
(32)

where X represents a divalent atomic group selected from the group consisting of O, S, Se, $CH_2$, NH and ester; $A^1$ represents an atomic group having a condensed ring in its structure; $R^1$ represents a hydrogen atom, a linear or branched alkyl group having 30 or less carbon atoms, or a halogen atom; and sl is an integer of 0 to 5.

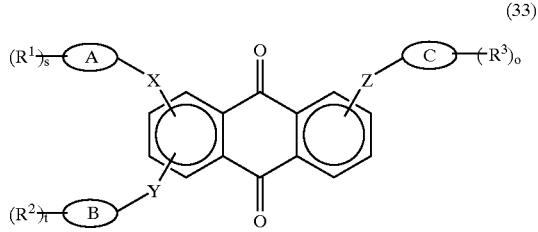
(33)

where, each of X, Y and Z, which may be the same or different, represents a divalent atomic group selected from the group consisting of O, S, Se, $CH_2$, NH and ester; at least one of A, B and C, which may be the same or different, represents an atomic group having a condensed ring in its structure, and the others represent a substituted or unsubstituted cyclic structure, a linear alkyl group or a branched alkyl group; each of $R^1$, $R^2$ and $R^3$, which may be the same or different, represents a hydrogen atom, a linear or branched alkyl group having 30 or less carbon atoms, or a halogen atom; and each of s, t and o represents an integer.

It is possible to further improve the solubility of the dichroic dye represented by general formula (1) by introducing into the compound of general formula (1) a substituent partially imparting a large dipole to the molecular structure. Some examples of the dichroic dyes having such a substituent introduced therein are represented by general formulas (34) and (35) given below:

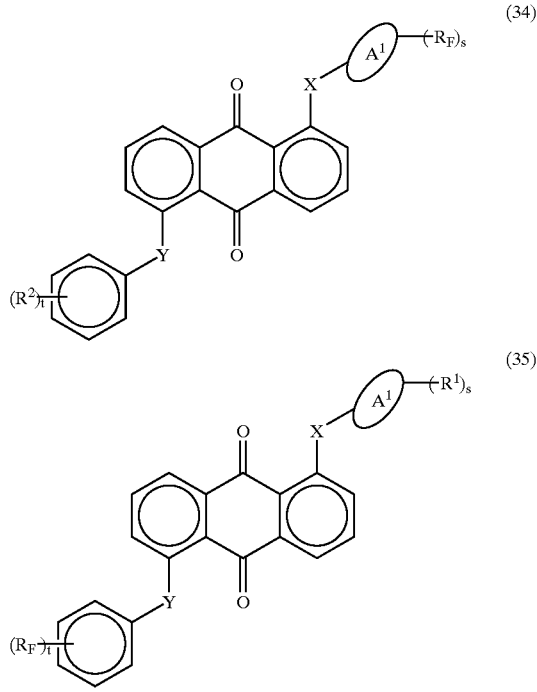

where X and Y, which may be the same or different, represents a divalent atomic group selected from the group consisting of O, S, Se, $CH_2$, NH and ester; $A^1$ represents an atomic group having a condensed ring in its structure; $R^1$ and $R^2$ represent a hydrogen atom, a linear or branched alkyl group having 30 or less carbon atoms, and a halogen atom; $R_F$ represents a linear or branched alkyl group having a fluorine atom in its structure; and each of s and t represents an integer.

The linear or branched alkyl group having a fluorine atom, which is introduced as $R_F$ into the compounds of general formulas (34) and (35) include, for example, $CF_3$, $C_2F_5$, $C_3F_7$, $C_4F_9$, t-$C_4F_9$, and i-$C_4F_9$. It is particularly desirable to introduce $CF_3$ as $R_F$ into the compounds of general formulas (34) and (35) because it is possible to achieve a high solubility without lowering the dichroic ratio.

It is most desirable to use the dichroic dye of the particular molecular structure because the dye exhibits a high solubility under room temperature and the solubility is not dependent on temperature.

Incidentally, it is possible to apply the dichroic dyes represented by general formulas (31) to (35) to the liquid crystal materials of a broad range because the particular dichroic dyes exhibit a high solubility in a liquid crystal material not having a condensed ring, and the solubility is not dependent on temperature.

The liquid crystal compound which have a condensed ring in its molecular structure and which can be used as a host liquid crystal material is represented by, for example, general formula (4) given below:

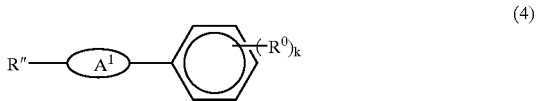

where R" represents a linear or branched alkyl group having 30 or less carbon atoms or a halogen atom; $A^1$ represents an atomic group having a condensed ring in its structure; $R^0$ represents a linear or branched alkyl group having 30 or less carbon atoms, a halogen atom, or an organic group having a halogen atom; and k is an integer of 1 to 5.

In view of the situation that the temperature range within which the liquid crystal phase is exhibited is enlarged, it is most desirable for R" to represent an alkyl group having two or more carbon atoms and for $R^0$ to represent a fluorine atom, a fluoroalkyl group or a fluoroalkoxy group. Also, in order to increase the dielectric anisotropy and to realize a dye having a high solubility, it is desirable for k to be at least 2.

The condensed ring portion denoted by $A^1$ in general formula (4) given above performs a strong mutual function with the condensed ring portion of the dichroic dye. In addition, it is possible to obtain the positional relationship of the molecules and the conformation of the substituent of the dichroic dye adapted for the mutual function. As conceptually shown in chemical formula (A) given below, the condensed rings in the liquid crystal material and the dichroic dye perform mutual functions so as to realize the optimum conformation:

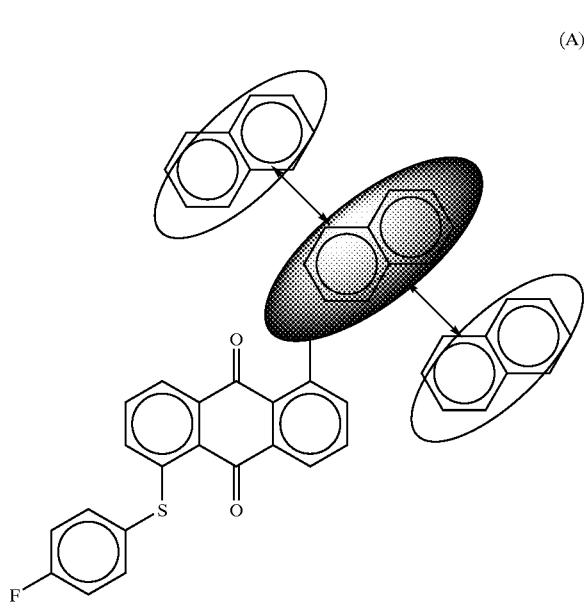

As already described, the GH liquid crystal composition according to one embodiment of the present invention comprises a host liquid crystal material and a dichroic dye mixed in the host liquid crystal material as a guest. It is necessary for each of the host liquid crystal material and the dichroic dye to have a condensed ring. It is desirable for the condensed ring to be selected from the group consisting of anthracene, naphthalene and tetrahydro naphthalene, because it is advantageous for a larger number of π electrons to be contained in the condensed ring in that the π electrons permit strengthening the intermolecular mutual function.

Alternatively, it is possible for the condensed ring included in the liquid crystal material and/or the dichroic dye contained in the GH liquid crystal composition according to one embodiment of the present invention to have a decahydro naphthalene skeleton. In this case, it is desirable for the condensed ring structure to assume a trans structure and for each of the terminal substituents at both ends of the skeleton to assume an equatrial arrangement. To be more specific, the condensed ring is constructed as represented by formula (5) given below:

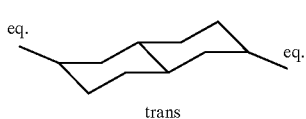

trans (5)

The linearity of the molecule can be derived from the trans arrangement of the condensed ring structure. In addition, it is possible to ensure a sufficient length of the molecule because each of the terminal substituents connected to both ends of the decahydro naphthalene skeleton assumes an equatrial arrangement.

The particular effect cannot be obtained when it comes to a decahydro naphthalene skeleton in which the condensed ring structure assumes a cis arrangement and each of the terminal substituents at both ends of the skeleton assumes an axial arrangement. To be more specific, it is impossible to ensure the linearity and a desired length of the molecule as shown in formula (6) given below:

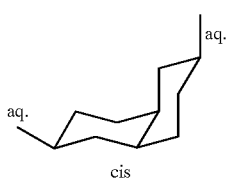

cis (6)

The GH liquid crystal composition according to one embodiment of the present invention can be used as a so-called "liquid crystal microcapsule", in which the liquid crystal layer is surrounded by a polymer outer wall. A display device can be obtained by forming a liquid crystal layer by printing a GH liquid crystal used in the form of the liquid crystal microcapsule to the substrate having a transparent electrode mounted thereon.

The accompanying FIGURE is a cross sectional view showing the construction of a liquid crystal display device according to one embodiment of the present invention. The liquid crystal display device shown in the FIGURE comprises a glass substrate 1 and an electrode (reflective electrode) 2 formed on the glass substrate 1. The electrode 2 is made of, for example, alumina. A liquid crystal layer 3 is formed on the electrode 2. The liquid crystal layer 3 contains a GH liquid crystal composition of one embodiment of the present invention, which is in the form of microcapsules. Further, a transparent electrode 4 made of, for example, ITO and the glass substrate 1 are arranged on the liquid crystal layer 3.

It is possible to decrease the manufacturing cost of the liquid crystal display device in the case of manufacturing the liquid crystal display device by the printing of a GH liquid crystal composition according to one embodiment of the present invention, which is used in the form of microcapsules. In addition, since the GH liquid crystal composition of one embodiment of the present invention permits maintaining a high dye concentration even in a low temperature region so as to obtain a high dichroic ratio, the liquid crystal display device of one embodiment of the present invention exhibits excellent display characteristics and a high reliability.

It is possible to use the condensed ring nematic liquid crystal manufactured by Dai-Nippon Ink Kagaku K.K. as the liquid crystal material, as reported in "Monthly Display, August 2000, page 85". It is possible to synthesize the liquid crystal material that can be used in one embodiment of the present invention by the method described in the literature referred to above.

On the other hand, where the compound represented by general formula (1) referred to previously is used as the dichroic dye, the dichroic dye can be synthesized by the substituting reaction of the anthraquinone-based dye in accordance with the route of the synthesis denoted by reaction formula (B) given below:

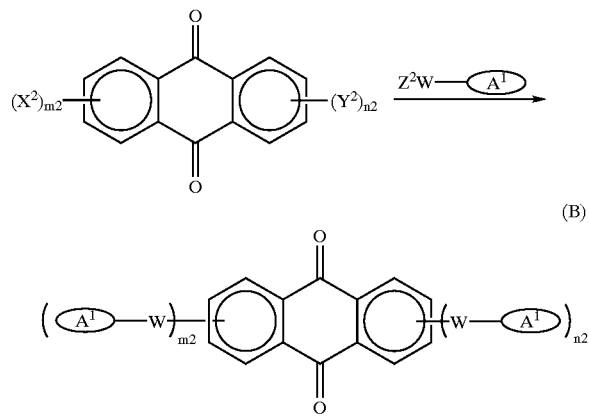

(B)

where $X^2$, $Y^2$ and $Z^2$ represent combinations of functional groups bringing about aromatic nucleophilic substituting reactions, $X^2$ and $Y^2$ being, for example, combinations of halogen atoms such as Cl and I and leaving groups such as a tosyl group (—OTsl); W represents O, S, Se, $CH_2$, NH or ester; $A^1$ represents a portion having a condensed ring; and each of m2 and n2 are integers of 1 to 4.

The GH liquid crystal composition of one embodiment of the present invention can be obtained by dissolving the dichroic dyes described above in the liquid crystal materials described above. It is desirable for the dichroic dye to be dissolved in the fluorine-based liquid crystal material in a concentration of at least 1.5% by weight, more preferably in a concentration of at least 20% by weight. Where the concentration of the dichroic dye is lower than 1.5% by weight, it is impossible to obtain a sufficient light absorption in the coloring step and, thus, the contrast is rendered insufficient so as to make it difficult to achieve the object.

To reiterate, the GH liquid crystal composition of one embodiment of the present invention comprises a liquid crystal material having a condensed ring in the molecular structure and a dichroic dye consisting of a compound having a condensed ring introduced therein as a substituent. It is desirable to use the GH liquid crystal composition of one embodiment of the present invention in the form of microcapsules. The microcapsules can be prepared by the known encapsulating methods such as a membrane emulsifying method, a phase separation method, a submerged drying method, an interfacial polymerization method, an in situ polymerization method, a submerged curing filming method and a spray drying method.

It is possible to use substantially all the high molecular weight materials for forming the wall of the microcapsules including, for example, polyethylenes; chlorinated polyethylenes; ethylene copolymers such as ethylene-vinyl acetate copolymer, and ethylene-acrylic acid-maleic anhydride copolymer; polybutadienes; polyesters such as polyethylene terephthalate, polybutylene terephthalate and polyethylene naphthalate; polypropylenes; polyisobutylenes; polyvinyl chlorides; natural rubbers; polyvinylidene chlorides; polyvinyl acetates; polyvinyl alcohols; polyvinyl acetals; polyvinyl butyrals; tetrafluoroethylene resin; trifluoroethylene resin; ethylene fluoride-propylene resin; vinylidene fluoride resin; vinyl fluoride resin; tetrafluoroethylene copolymers such as tetrafluoroethylene-perfluoroalkoxy ethylene copolymer, tetrafluoroethylene-perfluoroalkyl vinyl ether copolymer, tetrafluoroethylene-hexafluoropropylene copolymer, and tetrafluoroethylene-ethylene copolymer; fluorine-containing resins such as fluorine-containing polybenzoxazole; acrylic resins; methacrylic resins; fumaric acid resins; maleic acid resins; polyacrylonitrile; acrylonitrile copolymers such as acrylonitrile-butadiene-styrene copolymer; polystyrene, styrene-acrylonitrile copolymer; acetal resins; polyamides such as Nylon 66; polycarbonates; polyester carbonates; cellulose resins; phenolic resins; urea resins; epoxy resins; unsaturated polyester resins; alkyd resins; melamine resins; polyurethanes; diaryl phthalates; polyphenylene oxides; polyphenylene sulfides; polysulfones; polyphenyl sulfones; silicone resins; polyimides; bismaleimide triazine resins; polyimide amides; polyether imides; polyvinyl carbazoles; norbornene-based amorphous polyolefins; and celluloses.

In the liquid crystal composition according to one embodiment of the present invention, it is possible to disperse the liquid crystal microcapsules in a suitable binder resin for preparing an ink. However, if the binder resin is used in a large amount, the amount of the liquid crystal composition is decreased. Therefore, it is desirable for the amount of the binder resin to be not larger than 50% of the liquid crystal composition. Thermoplastic resins can be used in the present invention as the binder resin. The thermoplastic resins used as the binder resin include, for example, polyethylenes; chlorinated polyethylenes; ethylene copolymers such as ethylene-vinyl acetate copolymer, and ethylene-acrylic acid-maleic anhydride copolymer; polybutadienes; polyesters such as polyethylene terephthalate, polybutylene terephthalate and polyethylene naphthalate; polypropylenes; polyisobutylenes; polyvinyl chlorides; polyvinylidene chlorides; polyvinyl acetates; polyvinyl alcohols; polyvinyl acetals; polyvinyl butyrals; tetrafluoroethylene resins; trifluoroethylene chloride resins; ethylene fluoride-propylene resins; vinylidene fluoride resins; vinyl fluoride resins; tetrafluoroethylene copolymers such as tetrafluoroethylene-perfluoroalkoxy ethylene copolymer, tetrafluoroethylene-perfluoroalkyl vinyl ether copolymer, tetrafluoroethylene-hexafluoropropylene copolymer, and tetrafluoroethylene-ethylene copolymer; fluorine-containing resins such as fluorine-containing polybenzoxazole; acrylic resins; methacrylic resins such as polymethyl methacrylate; polyacrylonitriles; acrylonitrile copolymers such as acrylonitrile-butadiene-styrene copolymer; polystyrenes; halogenated polystyrenes; styrene copolymers such as styrene-methacrylic acid copolymer, styrene-acrylonitrile copolymer; polystyrene sodium sulfonate; ionic polymers such as polyacrylate sodium; acetal resins; polyamides such as Nylon 66; gelatin; gum arabic; polycarbonates; polyester carbonates; cellulose-based resins; phenolic resins; urea resins; epoxy resins; unsaturated polyester resins; alkyd resins; melamine resins; polyurethanes; diaryl phthalate resins; polyphenylene oxides; polyphenylene sulfides; polysulfones; polyphenylene sulfones; silicone resins; polyimides; bismaleimide triazine resins; polyimide amides; polyether sulfones; polymethyl pentenes; polyether ether ketones; polyether imides; polyvinyl carbazoles; and norbornene-based amorphous polyolefins.

Where the binder resin is soluble in water, it is possible to dissolve the binder resin in water and to disperse the liquid crystal microcapsules in the resultant solution. On the other hand, where the binder resin is insoluble in water, the binder resin is dispersed in water to form an emulsion and, then, the emulsion is mixed with the liquid crystal microcapsules so as to prepare an ink.

It is possible to manufacture the liquid crystal display device of one embodiment of the present invention easily and with a low cost by using the ink thus prepared.

The present invention will now be described more in detail with reference to Examples of the present invention, though the present invention is not limited to the following Examples.

EXAMPLE I

The saturation solubility and the dichroic ratio of the yellow dye were examined in Example I.

EXAMPLE I-1

Prepared as a liquid crystal material having a condensed ring was a condensed ring nematic liquid crystal material M-8 manufactured by Dai-Nippon Kagaku Kogyo K.K. Also prepared as a dichroic dye having the naphthalene skeleton introduced therein as a substituent was the compound represented by chemical formula (7) given below. The dichroic dye was synthesized as follows. Specifically, 1.5 mol equivalent of thionaphthol and 1.5 mol equivalent of 4-t-Bu-thiophenol were allowed to act on 1.5-dichloro anthraquinone within DMF under a $N_2$ gas stream. Incidentally, 2.5 mol equivalent of sodium carbonate was dissolved in DMF. After stirring at 80° C. for 5 hours, the system was left to stand for 24 hours and, then, the filtrate was condensed and refined by a dry column chromatogra phy. The resultant crystal was found to be a symmetrical dye.

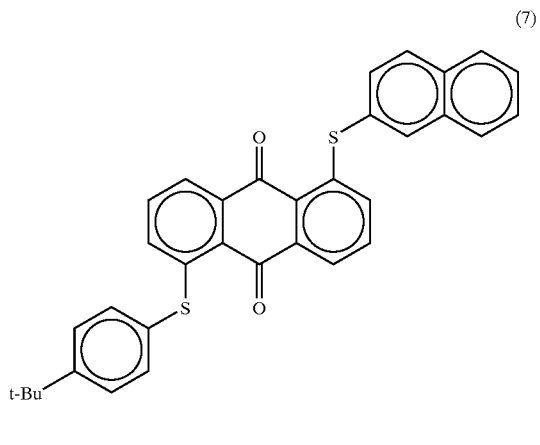

(7)

A GH liquid crystal composition was prepared by dissolving the dichroic dye thus obtained in the liquid crystal material referred to above.

EXAMPLE I-2

A compound having the tetrahydro naphthalene skeleton introduced therein as a substituent, which is represented by chemical formula (8) given below, was used as the dichroic dye. The compound of chemical formula (8) was synthesized as in Example I-1, except that tetrahydro thionaphthol was substituted for thionaphthol used in Example I-1.

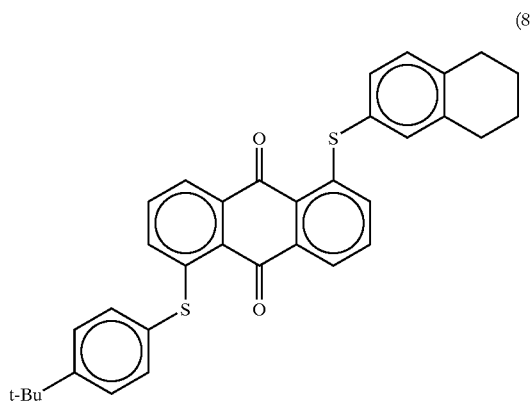

(8)

A GH liquid crystal composition was prepared as in Example I-1, except that used was the dichroic dye represented by chemical formula (8).

In the compound represented by general formula (8) given above, it is desirable for heavy hydrogen or an alkyl group such as a methyl group or an ethyl group to be substituted for the hydrogen atoms in the α-positions of the tetrahydro naphthalene portion, as shown in general formula (8') given below. The light-resistance of the resultant display device can be improved by this substitution.

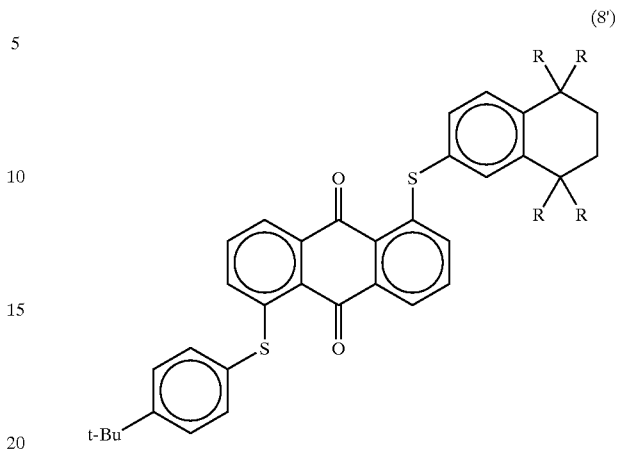

(8')

In general formula (8') given above, R represents heavy hydrogen or an alkyl group such as a methyl group and an ethyl group.

The compound represented by general formula (8') can be manufactured as follows. In the first step, a butyl lithium reagent is allowed to act on the compound represented by general formula (8) at $-78°$ C. with tetrahydrofuran used as a solvent. Then, heavy hydrogen, methyl iodide or ethyl iodide is allowed to act on the resultant compound so as to manufacture the compound represented by general formula (8').

EXAMPLE I-3

A compound having the decahydro naphthalene skeleton (trans. eq, eq) introduced therein, which is represented by chemical formula (9) given below, was used as the dichroic dye. The compound of chemical formula (9) was synthesized as in Example I-1, except that decahydro thionaphthol was substituted for thionaphthol used in Example I-1.

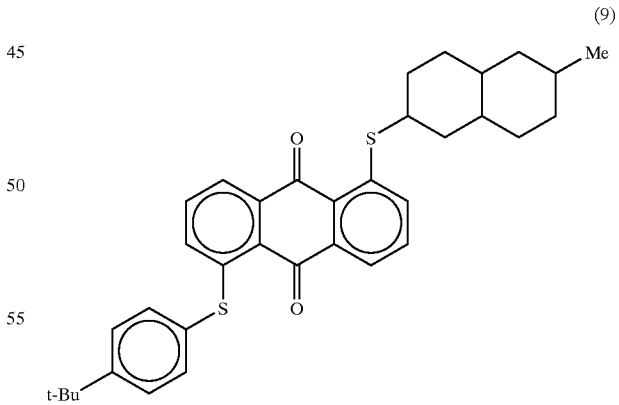

(9)

Since the compound of chemical formula (9) includes a bicyclohexyl portion (trans, eq, eq arrangement), the linearity and length of the molecule are ensured as described previously in conjunction with chemical formula (5).

A GH liquid crystal composition was prepared as in Example I-1, except that used was the dichroic dye represented by chemical formula (9).

EXAMPLE I-4

A compound having the naphthalene skeleton introduced therein, which is represented by chemical formula (10) given below, was used as the dichroic dye. The compound of chemical formula (10) was synthesized as in Example I-1, except that 3-trifluoromethyl thiophenol was substituted for 4-t-Bu-thiophenol used in Example I-1.

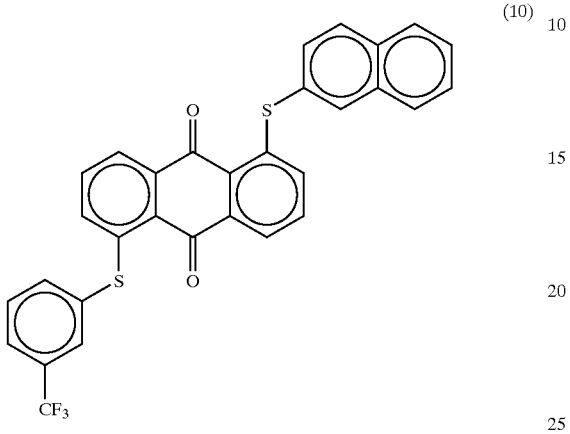

(10)

A GH liquid crystal composition was prepared as in Example I-1, except that used was the dichroic dye represented by chemical formula (10).

COMPARATIVE EXAMPLE I-1

A GH liquid crystal composition was prepared as in Example I-1, except that used as the dichroic dye was a compound having the decahydro naphthalene skeleton (cis. aq, aq) introduced therein, which is represented by chemical formula (11) given below.

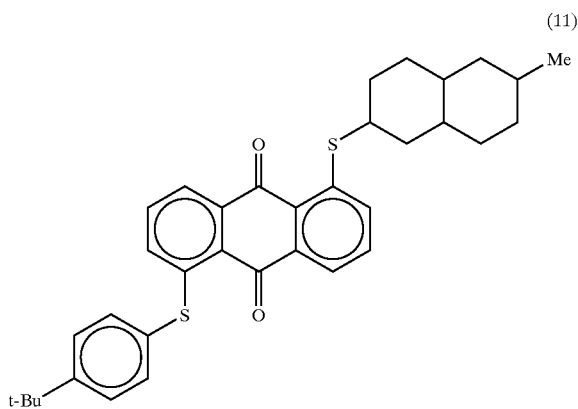

(11)

In the compound of the chemical formula (11), the bicyclohexyl portion is of (cis, aq, aq) arrangement. Therefore, the linearity and length of the compound are not ensured as apparent from chemical formula (6) given previously.

COMPARATIVE EXAMPLE I-2

Prepared as the liquid crystal material was LIXON5052 manufactured by Chisso Petrochemical Co., Ltd. Also prepared as the dichroic dye was the compound represented by chemical formula (12) given below. The liquid crystal material used was an ordinary nematic liquid crystal which did not have a condensed ring. Also, the dichroic dye was a conventional dichroic dye, which did not have a condensed ring. A GH liquid crystal composition was prepared by dissolving the dichroic dye represented by chemical formula (12) in the liquid crystal material noted above.

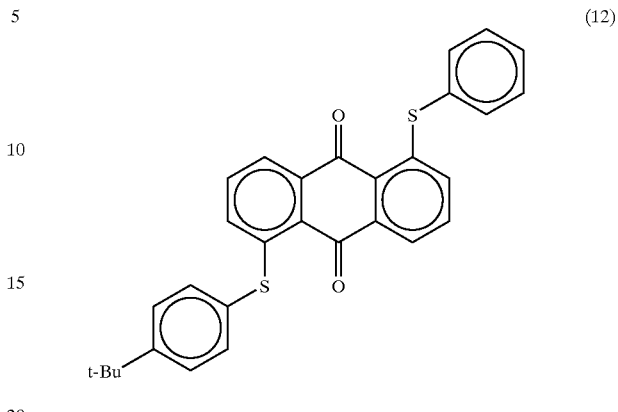

(12)

The saturation solubility and the dichroic ratio were measured for the liquid crystal composition prepared in each of the Examples and the Comparative Examples described above. Table 1 shows the results together with the dichroic dye used.

TABLE 1

| | | Dichromatic pigment | Saturation solubility (room temperature) wt % | Dichromatic ratio |
|---|---|---|---|---|
| Examples | (I-1) | Formula (7) | 6.0 | 11 |
| | (I-2) | Formula (8) | 5.0 | 11 |
| | (I-3) | Formula (9) | 5.0 | 11 |
| | (I-4) | Formula (10) | 7.0 | 11 |
| Comparative Examples | (I-1) | Formula (11) | 2.0 | 7 |
| | (I-2) | Formula (12) | 4.0 | 10 |

As apparent from Table 1, in the GH liquid crystal compositions for the Examples of the present invention (Examples I-1, I-2, I-3 and I-4) each comprising a liquid crystal material consisting of a compound having a condensed ring and a dichroic dye consisting of a compound having a condensed ring coupled as a substituent, the dichroic dye was high in the saturation solubility and in the dichroic ratio.

On the other hand, Comparative Example I-2 comprising a liquid crystal material not having a condensed ring and a dichroic dye was found to be inferior to the Examples of the present invention in the solubility and in the dichroic ratio. Further, Comparative Example I-1 using a dichroic dye in which the conformation of decahydro naphthalene was (cis, aq, aq) was markedly poor in solubility and dichroic ratio. It is considered reasonable to understand that the solubility and dichroic ratio were affected by the conformation of decahydro naphthalene, and the poor solubility and the poor dichroic ratio were caused by the lack in the linearity of the molecule.

EXAMPLE II

The saturation solubility and the dichroic ratio of the magenta dye were examined in Example II.

EXAMPLE II-1

Prepared as a liquid crystal material having a condensed ring was a condensed ring nematic liquid crystal material M-8 manufactured by Dai-Nippon Kagaku Kogyo K.K. Also prepared as a dichroic dye having the naphthalene skeleton introduced therein as a substituent was the compound represented by chemical formula (13) given below. The dichroic dye was synthesized as follows. Specifically, tosyl chloride was allowed to act on 1,5-dihydroxy anthraquinone within pyridine under a $N_2$ atmosphere at 40° C. while stirring the system for 40 hours. After the reaction product was isolated, 1.5 mol equivalent of 2-amino naphthalene and 1.5 mol equivalent of 4-t-Bu-aniline was allowed to act on the reaction product. The operation was performed by stirring the system at 90° C. for 30 hours within DMF under a $N_2$ atmosphere and in the presence of a Cu catalyst and $Na_2CO_3$. The reaction mixture was refined by a dry column chromatography and the desired compound was obtained as the filtrate.

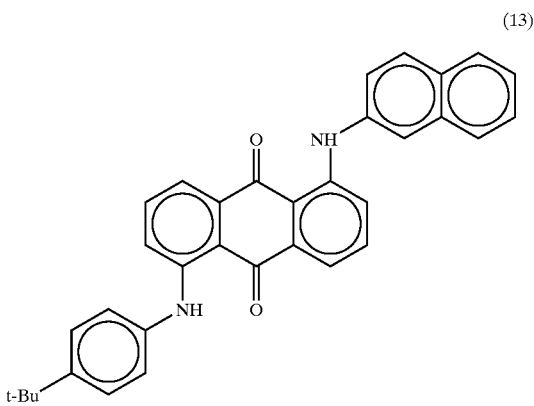

(13)

A GH liquid crystal composition was prepared by dissolving the dichroic dye thus prepared in the liquid crystal material referred to above.

EXAMPLE II-2

The compound having the tetrahydro naphthalene skeleton introduced therein as a substituent, which is represented by chemical formula (14) given below, was used as the dichroic dye. The compound of chemical formula (14) was synthesized as in Example II-1, except that 2-amino tetrahydro naphthalene was substituted for 2-amino naphthalene used in Example II-1.

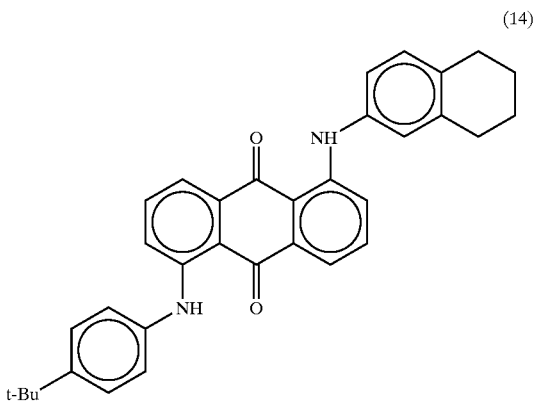

(14)

A GH liquid crystal composition was prepared as in Example II-1, except that used was the dichroic dye represented by chemical formula (14).

In the compound represented by general formula (14) given above, it is desirable for heavy hydrogen or an alkyl group such as a methyl group or an ethyl group to be substituted for the hydrogen atoms in the α-positions of the tetrahydro naphthalene portion, as shown in general formula (14') given below. The light-resistance of the resultant display device can be improved by this substitution.

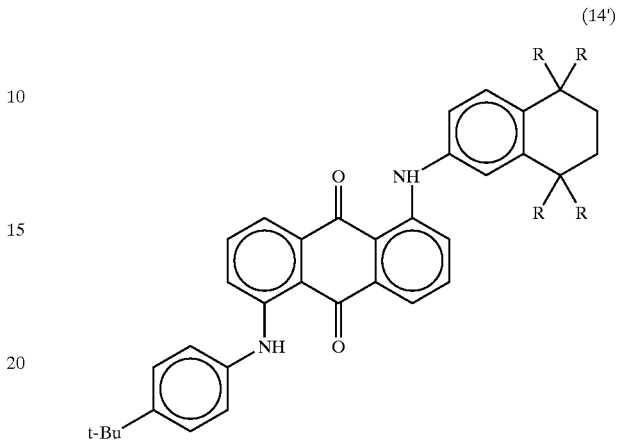

(14')

In general formula (14') given above, R represents heavy hydrogen or an alkyl group such as a methyl group and an ethyl group.

The compound represented by general formula (14') can be manufactured as follows. In the first step, a butyl lithium reagent is allowed to act on the compound represented by general formula (14) at −78° C. with tetrahydrofuran used as a solvent. Then, heavy hydrogen, methyl iodide or ethyl iodide is allowed to act on the resultant compound so as to manufacture the compound represented by general formula (14').

EXAMPLE II-3

The compound having the decahydro naphthalene skeleton (trans. eq, eq) introduced therein, which is represented by chemical formula (15) given below, was used as the dichroic dye. The compound of chemical formula (15) was synthesized as in Example II-1, except that 2-amino decahydro naphthalene was substituted for 2-amino naphthalene used in Example II-1.

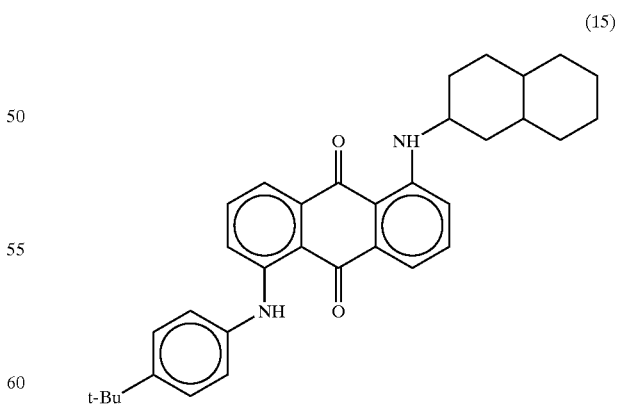

(15)

In the compound of chemical formula (15), the bicyclohexyl portion was of (trans, eq, eq) arrangement and, thus, the linearity and length of the molecule were ensured as described previously in conjunction with chemical formula (5).

A GH liquid crystal composition was prepared as in Example II-1, except that used was the dichroic dye represented by chemical formula (15).

COMPARATIVE EXAMPLE II-1

A GH liquid crystal composition was prepared as in Example II-1, except that the compound having the decahydro naphthalene skeleton (cis, aq, aq) introduced therein, which is presented by chemical formula (16) given below, was used as the dichroic dye:

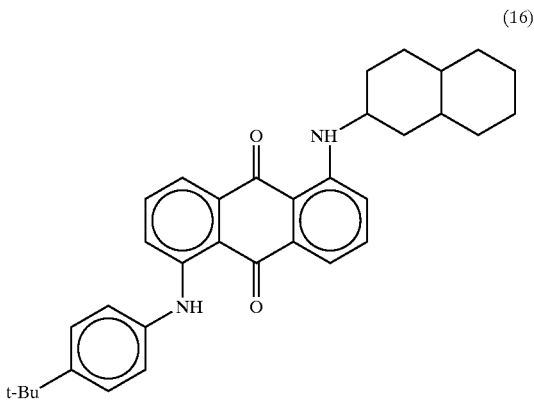

(16)

In the compound of chemical formula (16), the bicyclohexyl portion is of (cis, aq, aq) arrangement. Therefore, the linearity and length of the molecule were not ensured as described previously in conjunction with chemical formula (6).

COMPARATIVE EXAMPLE II-2

Prepared as the liquid crystal material was LIXON5052 manufactured by Chisso Petrochemical Co., Ltd. Also prepared as the dichroic dye was the compound represented by chemical formula (17) given below. The liquid crystal material used was an ordinary nematic liquid crystal which did not have a condensed ring. Also, the dichroic dye was a conventional dichroic dye, which did not have a condensed ring. A GH liquid crystal composition was prepared by dissolving the dichroic dye represented by chemical formula (17) in the liquid crystal material noted above.

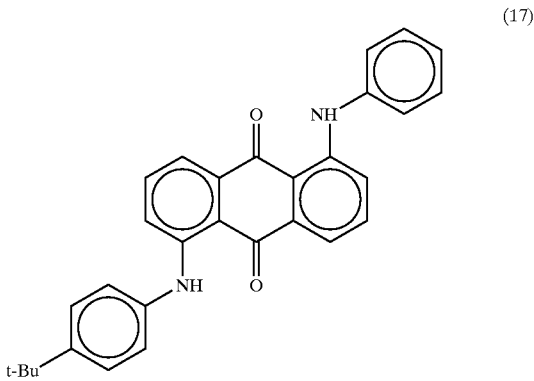

(17)

The saturation solubility and the dichroic ratio were measured for the liquid crystal composition prepared in each of the Examples and the Comparative Examples described above. Table 2 shows the results together with the dichroic dye used.

TABLE 2

| | | Dichromatic pigment | Saturation solubility (room temperature) wt % | Dichromatic ratio |
|---|---|---|---|---|
| Examples | (II-1) | Formula (13) | 2.4 | 7 |
| | (II-2) | Formula (14) | 2.1 | 7 |
| | (II-3) | Formula (15) | 2.0 | 7 |
| Comparative Examples | (II-1) | Formula (16) | 0.9 | 5 |
| | (II-2) | Formula (17) | 1.6 | 6 |

As apparent from Table 2, in the GH liquid crystal compositions for the Examples of the present invention (Examples II-1, II-2, and II-3) each comprising a liquid crystal material consisting of a compound having a condensed ring and a dichroic dye consisting of a compound having a condensed ring coupled as a substituent, the dichroic dye was high in the saturation solubility and in the dichroic ratio.

On the other hand, Comparative Example II-2 comprising a liquid crystal material not having a condensed ring and a dichroic dye was found to be inferior to the Examples of the present invention in the solubility and in the dichroic ratio. Further, Comparative Example II-1 using a dichroic dye in which the conformation of decahydro naphthalene was (cis, aq, aq) was markedly poor in solubility and dichroic ratio. It is considered reasonable to understand that the solubility and dichroic ratio were affected by the conformation of decahydro naphthalene, and the poor solubility and the poor dichroic ratio were caused by the lack in the linearity of the molecule.

EXAMPLE III

The saturation solubility and the dichroic ratio of the magenta dye were examined in Example III.

EXAMPLE III-1

Prepared as a liquid crystal material having a condensed ring was a condensed ring nematic liquid crystal material M-8 manufactured by Dai-Nippon Kagaku Kogyo K.K. Also prepared as a dichroic dye having the naphthalene skeleton introduced therein as a substituent was the compound represented by chemical formula (18) given below. The dichroic dye was synthesized as follows. Specifically, 2.2 mol equivalent of 4-t-Bu-thiphenol was allowed to act on 1,4-dihydroxy-5,8-dichloro anthraquinone. The operation was performed by stirring the system at 80° C. for 5 hours within DMF under a $N_2$ gas stream in the presence of $Na_2CO_3$. Further, the system was stirred at 80° C. for 5 hours within DMF under a $N_2$ gas stream in the presence of $Na_2CO_3$ so as to allow 2.2 mol equivalent of thionaphthol to act on the reaction product. The reaction mixture was refined by a dry column chromatography so as to obtain the desired compound.

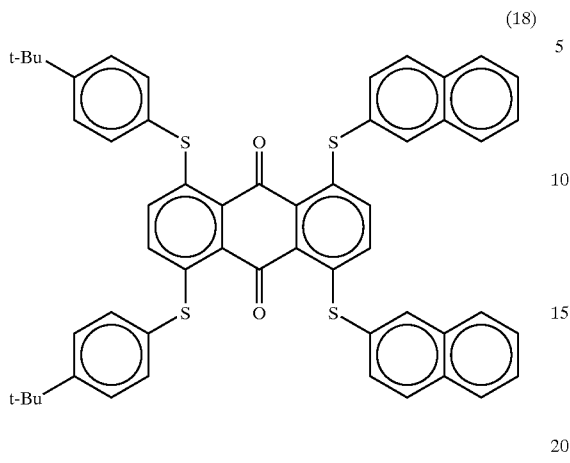

(18)

A GH liquid crystal composition was prepared by dissolving the dichroic dye thus prepared in the liquid crystal material referred to above.

EXAMPLE III-2

The compound having the tetrahydro naphthalene skeleton introduced therein as a substituent, which is represented by chemical formula (19) given below, was used as the dichroic dye. The compound of chemical formula (19) was synthesized as in Example III-1, except that tetrahydro thionaphthol was substituted for thionaphthol used in Example III-1.

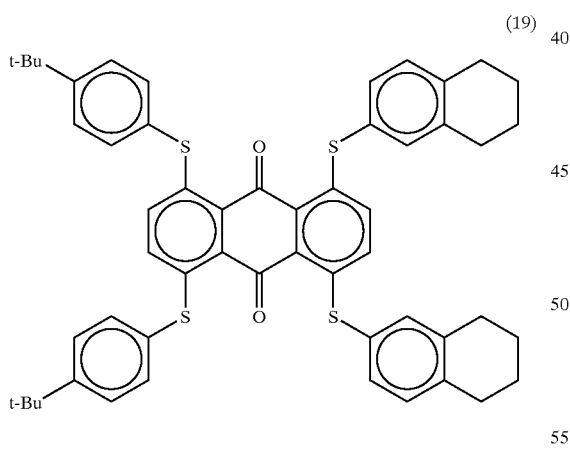

(19)

A GH liquid crystal composition was prepared as in Example III-1, except that used was the dichroic dye of chemical formula (19).

In the compound represented by general formula (19) given above, it is desirable for heavy hydrogen or an alkyl group such as a methyl group or an ethyl group to be substituted for the hydrogen atoms in the α-positions of the tetrahydro naphthalene portion, as shown in general formula (19') given below. The light-resistance of the resultant display device can be improved by this substitution.

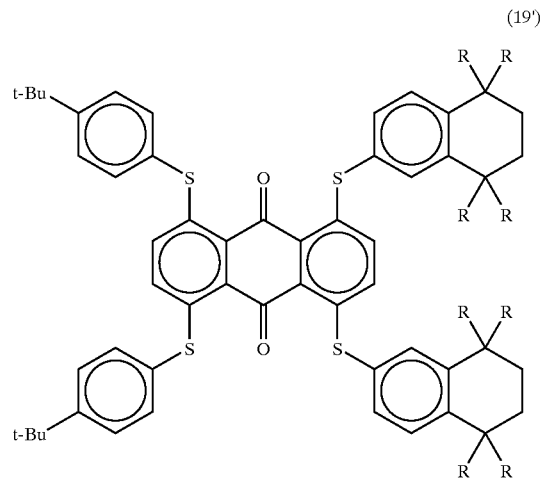

(19')

In general formula (19') given above, R represents heavy hydrogen or an alkyl group such as a methyl group and an ethyl group.

The compound represented by general formula (19') can be manufactured as follows. In the first step, a butyl lithium reagent is allowed to act on the compound represented by general formula (19) at −78° C. with tetrahydrofuran used as a solvent. Then, heavy hydrogen, methyl iodide or ethyl iodide is allowed to act on the resultant compound so as to manufacture the compound represented by general formula (19').

EXAMPLE III-3

The compound having the decahydro naphthalene skeleton (trans. eq, eq) introduced therein, which is represented by chemical formula (20) given below, was used as the dichroic dye. The compound of chemical formula (20) was synthesized as in Example III-1, except that decahydro thionaphthol was substituted for thionaphthol used in Example III-1.

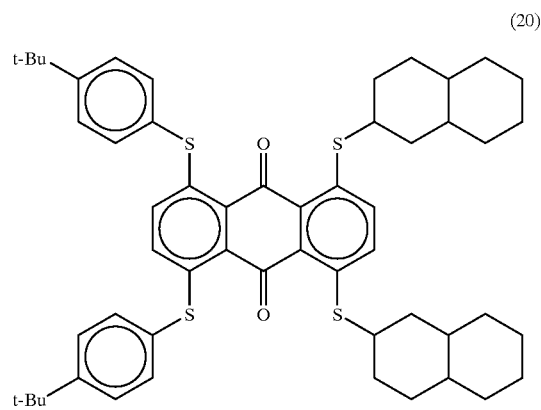

(20)

In the compound of chemical formula (20), the bicyclohexyl portion is of (trans, eq, eq) arrangement and, thus, the linearity and length of the molecule are ensured as described previously in conjunction with chemical formula (5).

A GH liquid crystal composition was prepared as in Example III-1, except that used was the dichroic dye of chemical formula (20).

COMPARATIVE EXAMPLE III-1

A GH liquid crystal composition was prepared as in Example III-1, except that the compound having the decahydro naphthalene skeleton (cis. aq, aq) introduced therein, which is represented by chemical formula (21) given below, was used as the dichroic dye:

(21)

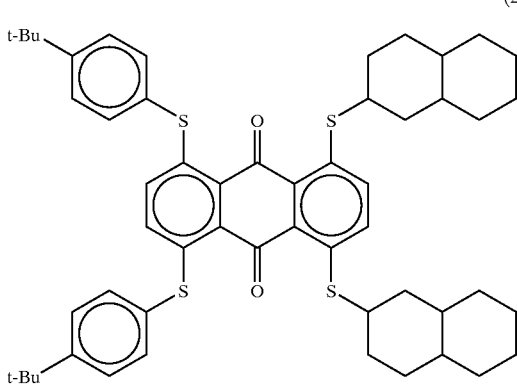

In the compound of chemical formula (21), the bicyclohexyl portion is of (cis, aq, aq) arrangement and, thus, the linearity and length of the molecule were not ensured as described previously in conjunction with chemical formula (6).

COMPARATIVE EXAMPLE III-2

Prepared as the liquid crystal material was LIXON5052 manufactured by Chisso Petrochemical Co., Ltd. Also prepared as the dichroic dye was the compound represented by chemical formula (22) given below. The liquid crystal material used was an ordinary nematic liquid crystal which did not have a condensed ring. Also, the dichroic dye was a conventional dichroic dye, which did not have a condensed ring as defined in the present invention. A GH liquid crystal composition was prepared by dissolving the dichroic dye represented by chemical formula (22) in the liquid crystal material noted above.

(22)

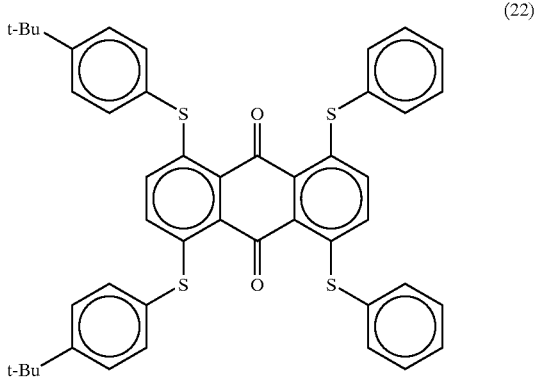

The saturation solubility and the dichroic ratio were measured for the liquid crystal composition prepared in each of the Examples and the Comparative Examples described above. Table 3 shows the results together with the dichroic dye used.

TABLE 3

| | | Dichromatic pigment | Saturation solubility (room temperature) wt % | Dichromatic ratio |
|---|---|---|---|---|
| Examples | (III-1) | Formula (18) | 3.0 | 11 |
| | (III-2) | Formula (19) | 2.8 | 11 |
| | (III-3) | Formula (20) | 2.5 | 11 |
| Comparative | (III-1) | Formula (21) | 1.0 | 7 |
| Examples | (III-2) | Formula (22) | 1.6 | 10 |

As apparent from Table 3, in the GH liquid crystal compositions for the Examples of the present invention (Examples III-1, III-2, and III-3) each comprising a liquid crystal material consisting of a compound having a condensed ring and a dichroic dye consisting of a compound having a condensed ring coupled as a substituent, the dichroic dye was high in the saturation solubility and in the dichroic ratio.

On the other hand, Comparative Example III-2 comprising a liquid crystal material not having a condensed ring and a dichroic dye was found to be inferior to the Examples of the present invention in the solubility and in the dichroic ratio. Further, Comparative Example III-1 using a dichroic dye in which the conformation of decahydro naphthalene was (cis, aq, aq) was markedly poor in solubility and dichroic ratio. It is considered reasonable to understand that the solubility and dichroic ratio were affected by the conformation of decahydro naphthalene, and the poor solubility and the poor dichroic ratio were caused by the lack in the linearity of the molecule.

EXAMPLE IV

The saturation solubility and dichroic ratio of the cyan dye were examined in Example IV.

EXAMPLE IV-1

Prepared as a liquid crystal material having a condensed ring was a condensed ring nematic liquid crystal material M-8 manufactured by Dai-Nippon Kagaku Kogyo K.K. Also prepared as a dichroic dye having the naphthalene skeleton introduced therein as a substituent was the compound represented by chemical formula (23) given below.

(23)

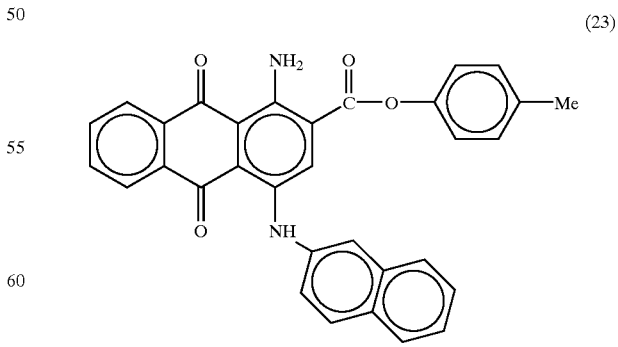

A GH liquid crystal composition was prepared by dissolving the dichroic dye of chemical formula (23) in the liquid crystal material referred to above.

EXAMPLE IV-2

The compound having the tetrahydro naphthalene skeleton introduced therein as a substituent, which is represented by chemical formula (24) given below, was used as the dichroic dye.

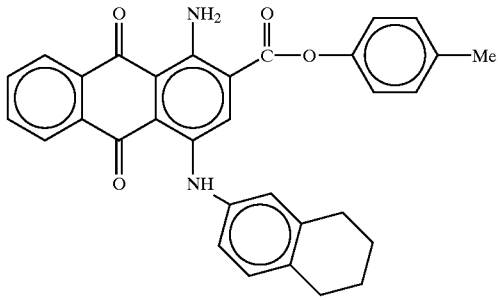

(24)

A GH liquid crystal composition was prepared as in Example IV-1, except that used was the dichroic dye of chemical formula (24).

In the compound represented by general formula (24) given above, it is desirable for heavy hydrogen or an alkyl group such as a methyl group or an ethyl group to be substituted for the hydrogen atoms in the α-positions of the tetrahydro naphthalene portion, as shown in general formula (24') given below. The light-resistance of the resultant display device can be improved by this substitution.

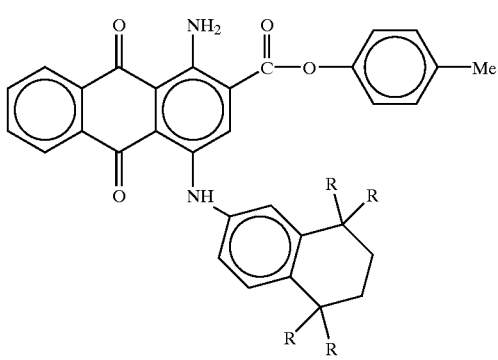

(24')

In general formula (24') given above, R represents heavy hydrogen or an alkyl group such as a methyl group and an ethyl group.

The compound represented by general formula (24') can be manufactured as follows. In the first step, a butyl lithium reagent is allowed to act on the compound represented by general formula (24) at −78° C. with tetrahydrofuran used as a solvent. Then, heavy hydrogen, methyl iodide or ethyl iodide is allowed to act on the resultant compound so as to manufacture the compound represented by general formula (24').

EXAMPLE IV-3

The compound having the decahydro naphthalene skeleton (trans. eq, eq) introduced therein, which is represented by chemical formula (25) given below, was used as the dichroic dye.

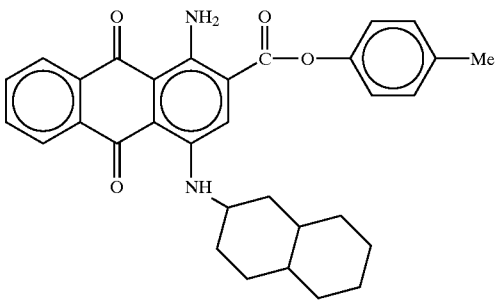

(25)

In the compound of chemical formula (25), the bicyclohexyl portion is of (trans, eq, eq) arrangement and, thus, the linearity and length of the molecule are ensured as described previously in conjunction with chemical formula (5).

A GH liquid crystal composition was prepared as in Example IV-1, except that used was the dichroic dye of chemical formula (25).

COMPARATIVE EXAMPLE IV-1

A GH liquid crystal composition was prepared as in Example IV-1, except that the compound having the decahydro naphthalene skeleton (cis. aq, aq) introduced therein, which is represented by chemical formula (26) given below, was used as the dichroic dye:

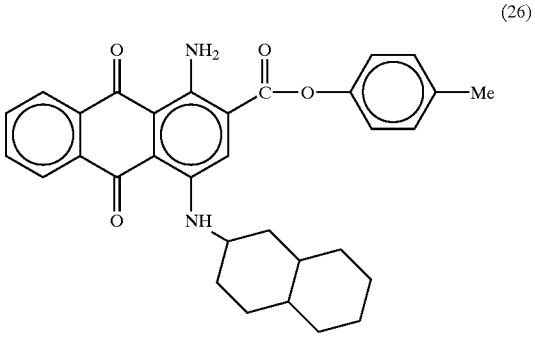

(26)

In the compound of chemical formula (26), the bicyclohexyl portion is of (cis, aq, aq) arrangement and, thus, the linearity and length of the molecule were not ensured as described previously in conjunction with chemical formula (6).

COMPARATIVE EXAMPLE IV-2

Prepared as the liquid crystal material was LIXON5052 manufactured by Chisso Petrochemical Co., Ltd. Also prepared as the dichroic dye was the compound represented by chemical formula (27) given below. The liquid crystal material used was an ordinary nematic liquid crystal which did not have a condensed ring. Also, the dichroic dye was a conventional dichroic dye, which did not have a condensed ring. A GH liquid crystal composition was prepared by dissolving the dichroic dye represented by chemical formula (27) in the liquid crystal material noted above.

(27)

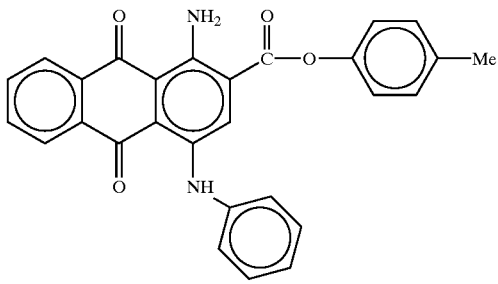

The saturation solubility and the dichroic ratio were measured for the liquid crystal composition prepared in each of the Examples and the Comparative Examples described above. Table 4 shows the results together with the dichroic dye used.

As apparent from Table 4, in the GH liquid crystal compositions for the Examples of the present invention (Examples IV-1, IV-2, and IV-3) each comprising a liquid crystal material consisting of a compound having a condensed ring and a dichroic dye consisting of a compound having a condensed ring coupled as a substituent, the dichroic dye was high in the saturation solubility and in the dichroic ratio.

On the other hand, Comparative Example IV-2 comprising a liquid crystal material not having a condensed ring and a dichroic dye was found to be inferior to the Examples of the present invention in the solubility and in the dichroic ratio. Further, Comparative Example IV-1 using a dichroic dye in which the conformation of decahydro naphthalene was (cis, aq, aq) was markedly poor in solubility and dichroic ratio. It is considered reasonable to understand that the solubility and dichroic ratio were affected by the conformation of decahydro naphthalene, and the poor solubility and the poor dichroic ratio were caused by the lack in the linearity of the molecule.

EXAMPLE V

EXAMPLE V-1

A yellow dichroic dye represented by chemical formula (36) given below was synthesized by the reaction given below:

(36)

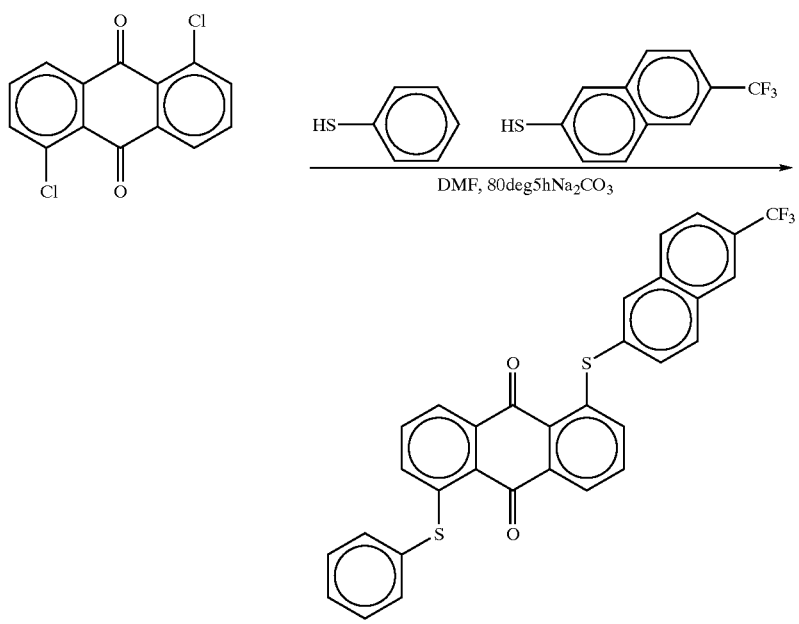

TABLE 4

|  |  | Dichromatic pigment | Saturation solubility (room temperature) wt % | Dichromatic ratio |
|---|---|---|---|---|
| Examples | (IV-1) | Formula (23) | 8.0 | 11 |
|  | (IV-2) | Formula (24) | 7.8 | 11 |
|  | (IV-3) | Formula (25) | 7.5 | 11 |
| Comparative | (IV-1) | Formula (26) | 3.0 | 7 |
| Examples | (IV-2) | Formula (27) | 5.0 | 10 |

A GH liquid crystal composition was prepared by dissolving the resultant dichroic dye in the condensed ring nematic liquid crystal material M-8 manufactured by Dai-Nippon Kagaku Kogyo K.K. A condensed ring was included in the liquid crystal material used.

EXAMPLE V-2

A dichroic dye represented by chemical formula (37) given below was synthesized by the reaction given below:

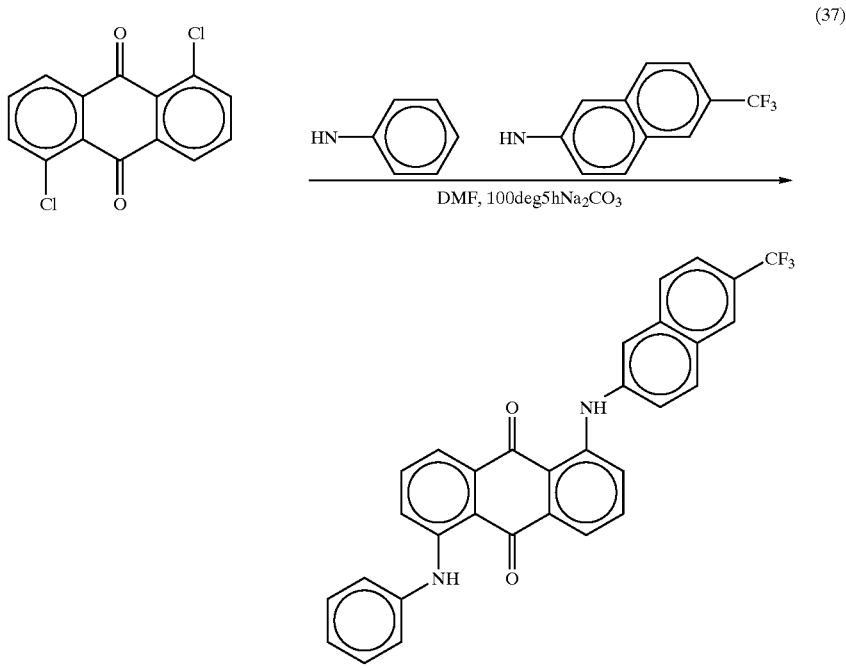

(37)

A GH liquid crystal composition was prepared as in Example V-1, except that used was the dichroic dye represented by chemical formula (37).

EXAMPLE V-3

A dichroic dye represented by chemical formula (38) given below was synthesized by the reaction given below:

(38)

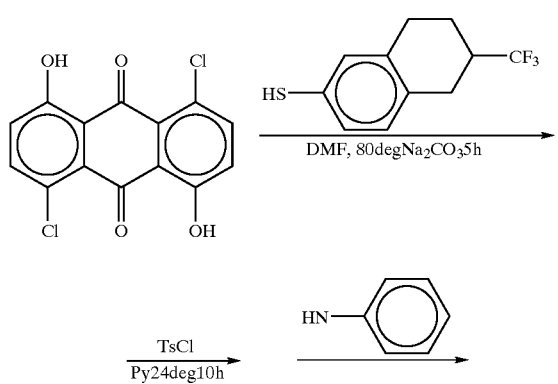

-continued

A GH liquid crystal composition was prepared as in Example V-1, except that used was the dichroic dye represented by chemical formula (38).

The dichroic dye used in each of Examples V-1 to V-3 was a compound having a condensed ring bonded thereto as a substituent, a $CF_3$ group being bonded to the condensed ring.

COMPARATIVE EXAMPLE V-1

A GH liquid crystal composition was prepared as in Example V-1, except that used was a dichroic dye represented by chemical formula (39) given below:

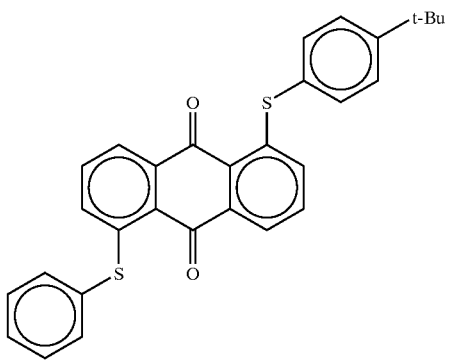

(39)

COMPARATIVE EXAMPLE V-2

A GH liquid crystal composition was prepared as in Example V-1, except that used was a dichroic dye represented by chemical formula (40) given below:

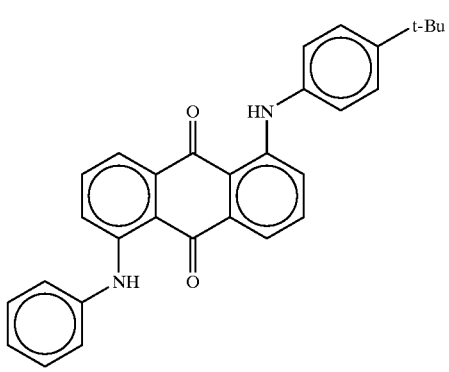

(40)

COMPARATIVE EXAMPLE V-3

A GH liquid crystal composition was prepared as in Example V-1, except that used was a dichroic dye represented by chemical formula (41) given below:

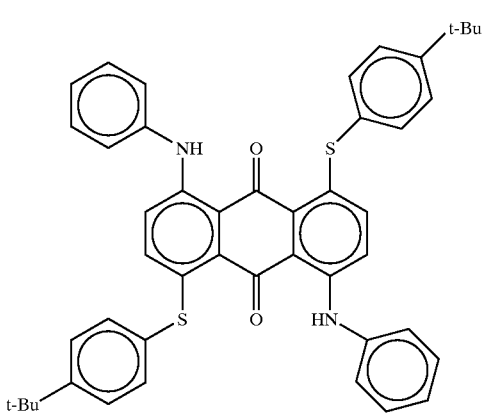

(41)

As apparent from chemical formulas (39), (40) and (41), a condensed ring was not included in the dichroic dye used in any of Comparative Examples V-1 to V-3.

The saturation solubility at 24° C. and at −6° C. and the dichroic ratio were measured in respect of the liquid crystal composition prepared in each of the Examples of the present invention and the Comparative Examples. Table 5 shows the results together with the dichroic dye used.

TABLE 5

| | | Dichromatic pigment | Saturation solubility (wt %) | | Dichromatic ratio |
| --- | --- | --- | --- | --- | --- |
| | | | 24° C. | −6° C. | |
| Examples | (V-1) | Formula (36) | 4.5 | 4.0 | 10 |
| | (V-2) | Formula (37) | 1.5 | 1.0 | 6 |
| | (V-3) | Formula (38) | 2.5 | 1.0 | 8 |
| Comparative Examples | (V-1) | Formula (39) | 4.0 | 1.7 | 10 |
| | (V-2) | Formula (40) | 1.5 | 0.06 | 6 |
| | (V-3) | Formula (41) | 2.5 | 0.06 | 8 |

As apparent from Table 5, in the GH liquid crystal compositions for the Examples of the present invention (Examples V-1, V-2, and V-3) each comprising a liquid crystal material consisting of a compound having a condensed ring and a dichroic dye consisting of a compound having a condensed ring, which has a $CF_3$ group, coupled as a substituent, the dichroic dye was high in the saturation solubility and in the dichroic ratio.

On the other hand, the liquid crystal compositions for the Comparative Examples, in which the dichroic dye used did not have a condensed ring, were inferior to the liquid crystal compositions for the Examples of the present invention in each of the solubility and the dichroic ratio. Particularly, the solubility was found to be markedly lowered under a low temperature in the liquid crystal compositions for the Comparative Examples.

REFERENCE EXAMPLES V-1 to V-3

A GH liquid crystal composition was prepared as in Examples V-1 to V-3, except that LIXON5052 manufactured by Chisso Petrochemical Co., Ltd. was used as the liquid crystal material. The liquid crystal used was an ordinary nematic liquid crystal, which did not include a condensed ring.

The saturation solubility at 24° C. and at −6° C. and the dichroic ratio were measured in respect of the liquid crystal composition prepared in each of the Reference Examples. Table 6 shows the results together with the dichroic dye used.

TABLE 6

| | | Dichromatic pigment | Saturation solubility (wt %) | | Dichromatic ratio |
| --- | --- | --- | --- | --- | --- |
| | | | 24° C. | −6° C. | |
| Reference Examples | (V-1) | Formula (36) | 4.5 | 4.3 | 12 |
| | (V-2) | Formula (37) | 3.0 | 2.8 | 8 |
| | (V-3) | Formula (38) | 4.0 | 3.8 | 10 |

As apparent from Table 6, in the GH liquid crystal compositions for the Reference Examples, each comprising a dichroic dye consisting of a compound having a condensed ring, which has a $CF_3$ group, coupled as a substituent, the dichroic dye exhibited a high solubility and a high dichroic ratio even in the case where the liquid crystal material did not have a condensed ring.

EXAMPLE VI

GH liquid crystal compositions for Examples VI-1 to VI-7 were prepared by dissolving the dichroic dyes represented by chemical formulas (42) to (48) given below in the condensed ring nematic liquid crystal material M-8 manufactured by Dai-Nippon Kagaku Kogyo K.K. The liquid crystal material used included a condensed ring.

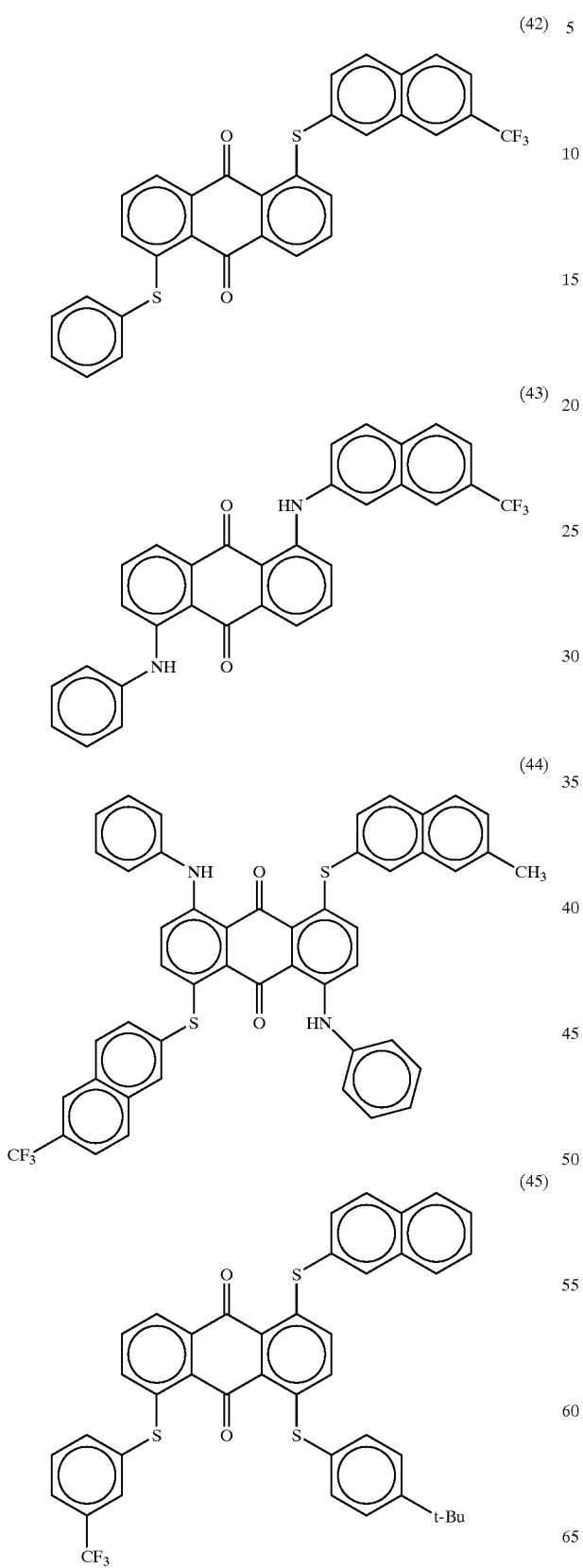

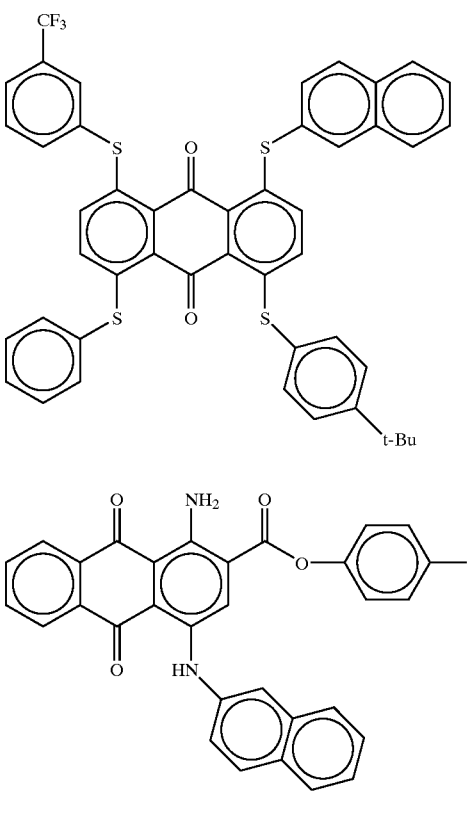

The saturation solubility at 24° C. and at −6° C. and the dichroic ratio were measured in respect of the liquid crystal composition prepared in each of Examples VI-1 to VI-7. Table 7 shows the results together with the dichroic dye used.

TABLE 7

|  |  | Dichromatic pigment | Saturation solubility (wt %) 24° C. | Saturation solubility (wt %) −6° C. | Dichromatic ratio |
| --- | --- | --- | --- | --- | --- |
| Examples | (VI-1) | Formula (42) | 5.5 | 5.0 | 12 |
|  | (VI-2) | Formula (43) | 4.1 | 3.3 | 9 |
|  | (VI-3) | Formula (44) | 4.6 | 4.3 | 9 |
|  | (VI-4) | Formula (45) | 6.5 | 4.5 | 10 |
|  | (VI-5) | Formula (46) | 4.5 | 2.6 | 10 |
|  | (VI-6) | Formula (47) | 6.7 | 5.4 | 11 |
|  | (VI-7) | Formula (48) | 7.0 | 4.5 | 10 |

As apparent from Table 7, in the liquid crystal compositions for the Examples of the present invention each comprising a liquid crystal material consisting of a compound having a condensed ring and a dichroic dye consisting of a compound having a condensed ring, the dichroic dye exhibits a high solubility and a high dichroic ratio. Particularly, in Examples VI-6 and VI-7, the dichroic dye exhibits a prominently high saturation solubility. These dichroic dyes are the compounds represented by general formula (3) given previously, in which A represents a benzene ring, B represents a naphthalene ring, and R and R' represent a sec-butyl group and a hydrogen atom, respectively.

Reference Example VI

GH liquid crystal compositions for Reference Examples VI-1 to VI-7 were prepared as in Example VI, except that the liquid crystal material used was changed to LIXON5052 manufactured by Chisso Petrochemical Co., Ltd. The liquid crystal material used was an ordinary nematic liquid crystal, which did not have a condensed ring.

The saturation solubility at 24° C. and at −6° C. and the dichroic ratio were measured in respect of the liquid crystal composition prepared in each of the Reference Examples VI-1 to VI-7. Table 8 shows the results together with the dichroic dye used.

TABLE 8

|  |  | Dichromatic pigment | Saturation solubility (wt %) 24° C. | Saturation solubility (wt %) −6° C. | Dichromatic ratio |
|---|---|---|---|---|---|
| Reference Examples | (VI-1) | Formula (42) | 4.5 | 4.3 | 12 |
|  | (VI-2) | Formula (43) | 3.0 | 2.8 | 8 |
|  | (VI-3) | Formula (44) | 4.0 | 3.8 | 10 |
|  | (VI-4) | Formula (45) | 5.0 | 4.0 | 10 |
|  | (VI-5) | Formula (46) | 3.0 | 2.0 | 10 |
|  | (VI-6) | Formula (47) | 5.6 | 4.3 | 10 |
|  | (VI-7) | Formula (48) | 5.5 | 4.0 | 10 |

As apparent from Table 8, in the GH liquid crystal compositions for Reference Examples VI-1 to VI-7 each comprising a dichroic dye consisting of a compound having a condensed ring, the dichroic dye exhibited a high solubility and a high dichroic ratio even in the case where the liquid crystal material used did not have a condensed ring. The dichroic dyes used in Reference Examples VI-6 and VI-7 exhibited particularly prominent effects.

EXAMPLE VII

GH liquid crystal compositions for Examples VII-1 to VII-3 were prepared by dissolving the dichroic dyes represented by chemical formulas (49) to (51) given below in the condensed ring nematic liquid crystal material M-8 manufactured by Dai-Nippon Kagaku Kogyo K.K. The liquid crystal material used included a condensed ring.

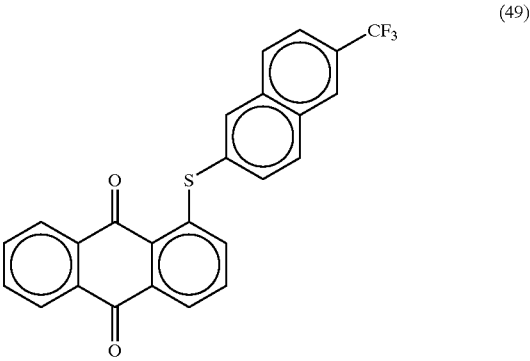

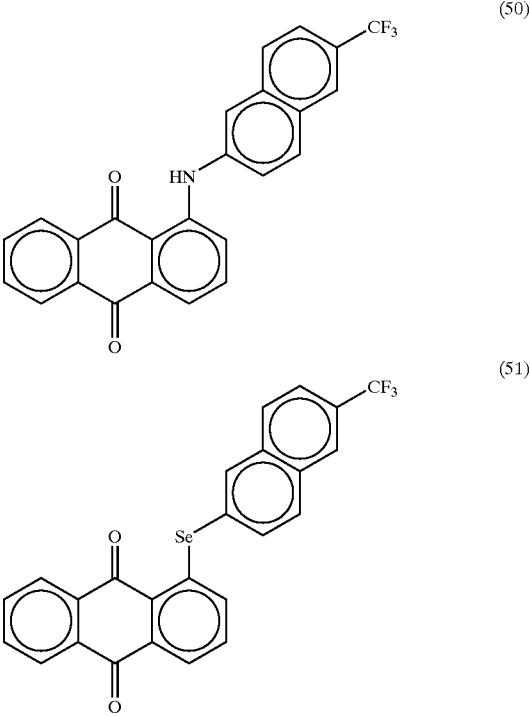

The saturation solubility at 24° C. and at −6° C. and the dichroic ratio were measured in respect of the liquid crystal composition prepared in each of Examples VII-1 to VII-3. Table 9 shows the results together with the dichroic dye used.

TABLE 9

|  |  | Dichromatic pigment | Saturation solubility (wt %) 24° C. | Saturation solubility (wt %) −6° C. | Dichromatic ratio |
|---|---|---|---|---|---|
| Examples | (VII-1) | Formula (49) | 3.0 | 2.5 | 8 |
|  | (VII-2) | Formula (50) | 1.5 | 1.2 | 6 |
|  | (VII-3) | Formula (51) | 3.4 | 3.0 | 10 |

As apparent from Table 9, in the GH liquid crystal compositions for Examples VII-1 to VII-3 each comprising a liquid crystal material consisting of a compound having a condensed ring and a dichroic dye consisting of a compound having a condensed ring, the dichroic dye exhibited a high solubility and a high dichroic ratio.

EXAMPLE VIII

A black GH liquid crystal composition was prepared by dissolving the yellow dye for Example I-1, the magenta dye for Example III-2 and the cyan dye for Example IV-3 in the liquid crystal material M-8 to reach the saturation solubility shown in Tables 1, 3 and 4, respectively.

Dissolved in 100 parts by weight of the resultant black GH liquid crystal composition were 5 parts by weight of a hydrophilic methyl methacrylate monomer, 5 parts by weight of a hydrophobic isobutyl methacrylate, 1 part by weight of ethylene glycol dimethacrylate used as a crosslinking agent, and 0.2 part by weight of benzoyl peroxide so as to prepare a solution, followed by adding 3 parts by weight of polyvinyl alcohol and 300 parts by weight of pure water and emulsifying the aqueous system with a homogenizer. Then, the resultant emulsion was subjected to polymerization at 85° C. After the polymerization was performed for one hour, the reaction mixture was filtered with a filter of 1 μm, followed by washing three times the filtrate with a pure water so as to obtain liquid crystal microcapsules having an average diameter of 10 μm and covered with a film of a transparent high molecular weight material. Incidentally, the diameter of the microcapsule was controlled by adjusting the stirring speed.

On the other hand, prepared was a 5% aqueous dispersion of vinyl acetate fine particles having an average particle diameter of 0.5 μm as a binder resin. Then, the liquid crystal microcapsules referred to above were dispersed in the aqueous dispersion such that the liquid crystal microcapsules have a concentration of 10% so as to prepare an MC ink.

An MC layer was formed by a screen printing method on a substrate provided with an ITO layer by using the MC ink thus prepared. Further, a counter substrate was bonded to the substrate having the MC layer formed thereon by a vacuum contact bonding so as to prepare an MC liquid crystal cell having a thickness of 5 μm.

COMPARATIVE EXAMPLE VIII

A black GH liquid crystal composition was prepared by dissolving the yellow dye for Comparative Example I-1, the magenta dye for Comparative Example III-1 and the cyan dye for Comparative Example IV-1 in LIXON5052 used as a liquid crystal material to reach the saturation solubility shown in Tables 1, 3 and 4, respectively.

A liquid crystal MC was prepared and a display device was manufactured as in Example VIII, except that used was the resultant black GH liquid crystal composition.

The contrast of the display device manufactured in each of Example VIII and Comparative Example VIII was measured. The contrast for Example VIII using the liquid crystal composition of the present invention was found to be 11. On the other hand, the contrast of the display device for Comparative Example VIII was found to be 5.5, which was markedly lower than that for Example VIII.

In the liquid crystal composition used for manufacturing the display device for Example VIII, a condensed ring is included in each of the liquid crystal material and the dichroic dye so as to improve the solubility and the dichroic ratio of the dichroic dye as already described. As a result, it was possible to obtain a markedly high contrast.

As described above in detail, the present invention provides a guest-host liquid crystal composition of a high dichroic ratio, which permits maintaining a high dye concentration even under a low temperature. The present invention also provides a liquid crystal display device excellent in display characteristics and reliability.

It follows that the present invention permits realizing a portable liquid crystal display device low in power consumption and capable of a clear display and, thus, has a prominent industrial value.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A guest-host liquid crystal composition, comprising:

a host liquid crystal material, said liquid crystal material having a condensed ring in the molecular structure; and a dichroic dye mixed as a guest in the host liquid crystal material, said dichroic dye having a condensed ring as a substituent bonded to the basic skeleton.

2. The guest-host liquid crystal composition according to claim 1, wherein said dichroic dye is a compound represented by general formula (1) given below:

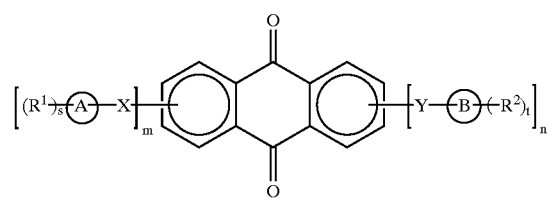

(1)

where X and Y, which may be the same or different, denote a divalent atomic group selected from the group consisting of O, S, Se, $CH_2$, NH and ester; at least one of A and B, which may be the same or different, denotes an atomic group having a condensed ring in its structure, and the other denotes a substituted or unsubstituted cyclic structure, a linear alkyl group or a branched alkyl group; $R^1$ and $R^2$, which may be the same or different, denote a hydrogen atom, a linear or branched alkyl group having 30 or less carbon atoms, or a halogen atom; s and t denote integers; and m and n denote integers falling within a range of between 0 and 4, at least one of m and n being not zero.

3. The guest-host liquid crystal composition according to claim 1, wherein said dichroic dye is a compound represented by general formula (31) given below:

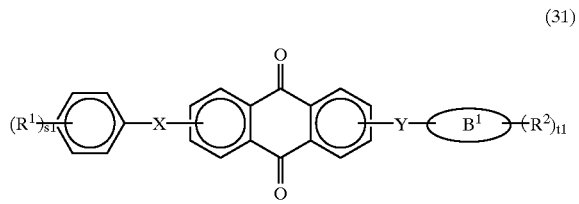

(31)

where each of X and Y, which may be the same or different, represents a divalent atomic group selected from the group consisting of O, S, Se, $CH_2$, NH and ester; $B^1$ represents an atomic group having a condensed ring in its structure; each of $R^1$ and $R^2$, which may be the same or different, represents a hydrogen atom, a linear or branched alkyl group having 30 or less carbon atoms, and a halogen atom; s1 is an integer of 0 to 5; and t1 is an integer of 1 to 7.

4. The guest-host liquid crystal composition according to claim 3, wherein at least one of said $R^1$ and $R^2$ is a linear or branched alkyl group having a fluorine atom in its structure.

5. The guest-host liquid crystal composition according to claim 2, wherein said dichroic dye is a compound represented by general formula (32) given below:

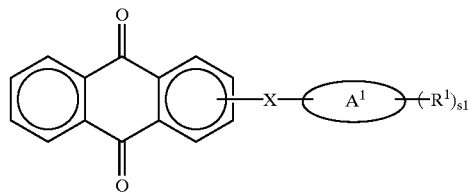

(32)

where X represents a divalent atomic group selected from the group consisting of O, S, Se, $CH_2$, NH and ester; $A^1$ represents an atomic group having a condensed ring in its structure; $R^1$ represents a hydrogen atom, a linear or branched alkyl group having 30 or less carbon atoms, or a halogen atom; and s1 is an integer of 0 to 5.

6. The guest-host liquid crystal composition according to claim 5, wherein said $R^1$ includes a linear or branched alkyl group having a fluorine atom in its structure.

7. The guest-host liquid crystal composition according to claim 2, wherein said dichroic dye is a compound represented by general formula (33) given below:

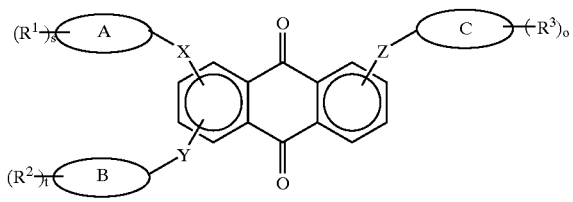

(33)

where, each of X, Y and Z, which may be the same or different, represents a divalent atomic group selected from the group consisting of O, S, Se, $CH_2$, NH and ester; at least one of A, B and C, which may be the same or different, represents an atomic group having a condensed ring in its structure, and the others represent a substituted or unsubstituted cyclic structure, a linear alkyl group or a branched alkyl group; each of $R^1$, $R^2$ and $R^3$, which may be the same or different, represents a hydrogen atom, a linear or branched alkyl group having 30 or less carbon atoms, or a halogen atom; and each of s, t and o represents an integer.

8. The guest-host liquid crystal composition according to claim 7, wherein at least one of said $R^1$, $R^2$ and $R^3$ is a linear or branched alkyl group having a fluorine atom in its structure.

9. The guest-host liquid crystal composition according to claim 1, wherein said dichroic dye is a compound represented by general formula (2) given below:

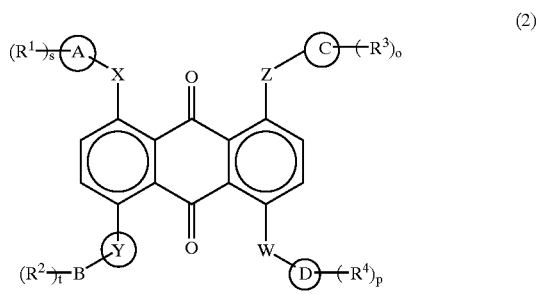

(2)

where each of X, Y, Z and W, which may be the same or different, denotes a divalent atomic group selected from the group consisting of O, S, Se, $CH_2$, NH and ester; at least one of A, B, C and D, which may be the same or different, denotes an atomic group having a condensed ring in its structure, and the others denote a substituted or unsubstituted cyclic structure, a linear alkyl group or a branched alkyl group; each of $R^1$, $R^2$, $R^3$ and $R^4$, which may be the same or different, denotes a hydrogen atom, a linear or branched alkyl group having 30 or less carbon atoms or a halogen atom; and s, t, o and p denote an integer.

10. The guest-host liquid crystal composition according to claim 1, wherein said dichroic dye is a compound represented by general formula (3) given below:

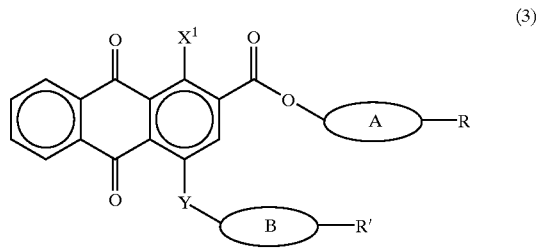

(3)

where $X^1$ denotes an amino group selected from the group consisting of $NH_2$, $NHR^{11}$ and $NH(R^{12})$, wherein each of $R^{11}$ and $R^{12}$ denote a linear or branched alkyl group having 30 or less carbon atoms; Y denotes a divalent atomic group selected from the group consisting of O, S, Se, $CH_2$, NH and ester; at least one of A and B, which may be the same or different, denotes an atomic group having a condensed ring in its structure, and the other denotes a substituted or unsubstituted cyclic structure, a linear alkyl group or a branched alkyl group; and each of R and R', which may be the same or different, denotes a hydrogen atom, a linear or branched alkyl group having 30 or less carbon atoms and a halogen atom.

11. The guest-host liquid crystal composition according to claim 1, wherein said liquid crystal material is a compound represented by general formula (4) given below:

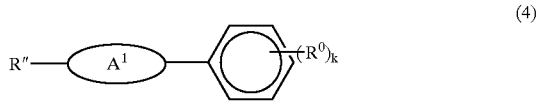

(4)

where R" represents a linear or branched alkyl group having 30 or less carbon atoms or a halogen atom; $A^1$ represents an atomic group having a condensed ring in its structure; $R^0$ represents a linear or branched alkyl group having 30 or less carbon atoms, a halogen atom, or an organic group having a halogen atom; and k is an integer of 1 to 5.

12. The guest-host liquid crystal composition according to claim 1, wherein said condensed ring is selected from the group consisting of anthracene, naphthalene and tetrahydro naphthalene.

13. The guest-host liquid crystal composition according to claim 1, wherein said condensed ring has the decahydro naphthalene skeleton of the trans arrangement, and each of the terminal substituents of said decahydro naphthalene skeleton is of an equatrial arrangement.

14. A liquid crystal display device, comprising:
    a substrate having an electrode mounted thereto;
    a liquid crystal layer arranged on said electrode; and
    a transparent electrode arranged on said liquid crystal layer;
    wherein said liquid crystal layer comprises a host liquid crystal material and a dichroic dye mixed as a guest in the host liquid crystal material, said liquid crystal material having a condensed ring in the molecular structure, and said dichroic dye having a condensed ring as a substituent bonded to the basic skeleton.

15. The liquid crystal display device according to claim 14, wherein said dichroic dye is a compound represented by general formula (1) given below:

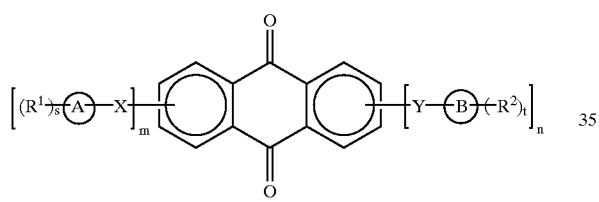

(1)

where X and Y, which may be the same or different, denote a divalent atomic group selected from the group consisting of O, S, Se, $CH_2$, NH and ester; at least one of A and B, which may be the same or different, denotes an atomic group having a condensed ring in its structure, and the other denotes a substituted or unsubstituted cyclic structure, a linear alkyl group or a branched alkyl group; $R^1$ and $R^2$, which may be the same or different, denote a hydrogen atom, a linear or branched alkyl group having 30 or less carbon atoms, or a halogen atom; s and t denote integers; and m and n denote integers falling within a range of between 0 and 4, at least one of m and n being not zero.

16. The liquid crystal display device according to claim 15, wherein said dichroic dye is a compound represented by general formula (31) given below:

where each of X and Y, which may be the same or different, represents a divalent atomic group selected from the group consisting of O, S, Se, $CH_2$, NH and ester; $B^1$ represents an atomic group having a condensed ring in its structure; each of $R^1$ and $R^2$, which may be the same or different, represents a hydrogen atom, a linear or branched alkyl group having 30 or less carbon atoms, and a halogen atom; s1 is an integer of 0 to 5; and t1 is an integer of 1 to 7.

17. The liquid crystal display device according to claim 15, wherein said dichroic dye is a compound represented by general formula (32) given below:

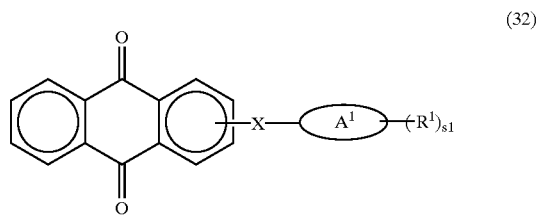

(32)

where X represents a divalent atomic group selected from the group consisting of O, S, Se, $CH_2$, NH and ester; $A^1$ represents an atomic group having a condensed ring in its structure; $R^1$ represents a hydrogen atom, a linear or branched alkyl group having 30 or less carbon atoms, or a halogen atom; and s1 is an integer of 0 to 5.

18. The liquid crystal display device according to claim 15, wherein said dichroic dye is a compound represented by general formula (33) given below:

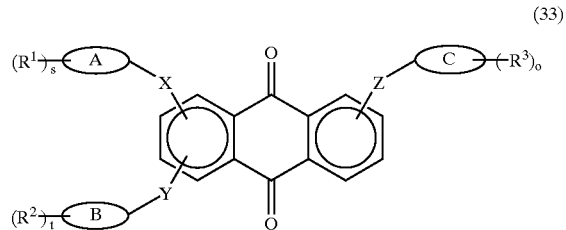

(33)

where, each of X, Y and Z, which may be the same or different, represents a divalent atomic group selected from the group consisting of O, S, Se, $CH_2$, NH and ester; at least one of A, B and C, which may be the same or different, represents an atomic group having a condensed ring in its structure, and the others represent a substituted or unsubstituted cyclic structure, a linear alkyl group or a branched alkyl group; each of $R^1$, $R^2$ and $R^3$, which may be the same or different, represents a hydrogen atom, a linear or branched alkyl group having 30 or less carbon atoms, or a halogen atom; and each of s, t and o represents an integer.

(31)

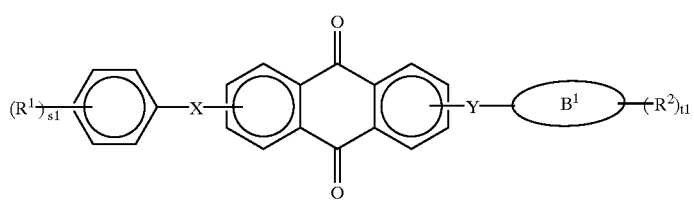

19. The liquid crystal display device according to claim 14, wherein said dichroic dye is a compound represented by general formula (2) given below:

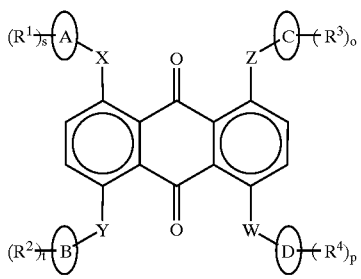
(2)

where each of X, Y, Z and W, which may be the same or different, denotes a divalent atomic group selected from the group consisting of O, S, Se, $CH_2$, NH and ester; at least one of A, B, C and D, which may be the same or different, denotes an atomic group having a condensed ring in its structure, and the others denote a substituted or unsubstituted cyclic structure, a linear alkyl group or a branched alkyl group; each of $R^1$, $R^2$, $R^3$ and $R^4$, which may be the same or different, denotes a hydrogen atom, a linear or branched alkyl group having 30 or less carbon atoms or a halogen atom; and s, t, o and p denote an integer.

20. The liquid crystal display device according to claim 14, wherein said dichroic dye is a compound represented by general formula (3) given below:

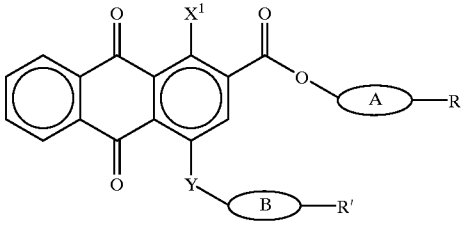
(3)

where $X^1$ denotes an amino group selected from the group consisting of $NH_2$, $NHR^{11}$ and $NH(R^{12})$, wherein each of $R^{11}$ and $R^{12}$ denote a linear or branched alkyl group having 30 or less carbon atoms; Y denotes a divalent atomic group selected from the group consisting of O, S, Se, $CH_2$, NH and ester; at least one of A and B, which may be the same or different, denotes an atomic group having a condensed ring in its structure, and the other denotes a substituted or unsubstituted cyclic structure, a linear alkyl group or a branched alkyl group; and each of R and R', which may be the same or different, denotes a hydrogen atom, a linear or branched alkyl group having 30 or less carbon atoms and a halogen atom.

* * * * *

UNITED STATES PATENT AND TRADEMARK OFFICE
CERTIFICATE OF CORRECTION

PATENT NO.    : 6,656,542 B2
DATED         : December 2, 2003
INVENTOR(S)   : Iwanaga et al.

It is certified that error appears in the above-identified patent and that said Letters Patent is hereby corrected as shown below:

Column 40,
Lines 1-12, in formula (2), change

"  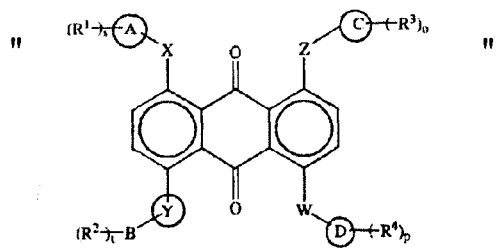  "

to

--  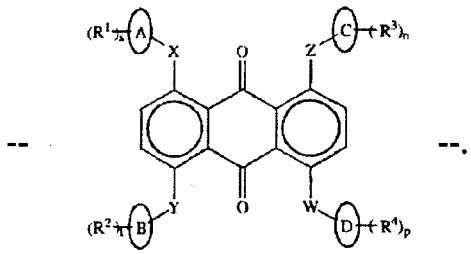  --.

Signed and Sealed this

Twenty-fourth Day of August, 2004

JON W. DUDAS
*Director of the United States Patent and Trademark Office*